United States Patent
Kim

(10) Patent No.: US 10,313,467 B2
(45) Date of Patent: Jun. 4, 2019

(54) CONTEXTUAL ROUTING DEVICE CACHING

(71) Applicant: Belkin International, Inc., Playa Vista, CA (US)

(72) Inventor: Ryan Yong Kim, Rolling Hills Estates, CA (US)

(73) Assignee: Belkin International, Inc., Playa Vista, CA (US)

( * ) Notice: Subject to any disclaimer, the term of this patent is extended or adjusted under 35 U.S.C. 154(b) by 561 days.

(21) Appl. No.: 14/493,193

(22) Filed: Sep. 22, 2014

(65) Prior Publication Data
US 2016/0088112 A1  Mar. 24, 2016

Related U.S. Application Data

(63) Continuation of application No. 14/493,075, filed on Sep. 22, 2014, now Pat. No. 9,191,374.

(51) Int. Cl.
*H04L 12/28* (2006.01)
*H04L 29/08* (2006.01)
*H04L 29/06* (2006.01)
*H04L 12/747* (2013.01)
*H04L 12/947* (2013.01)

(52) U.S. Cl.
CPC ...... *H04L 67/2842* (2013.01); *H04L 12/2834* (2013.01); *H04L 29/08801* (2013.01); *H04L 29/08891* (2013.01); *H04L 45/742* (2013.01); *H04L 49/252* (2013.01); *H04L 63/0428* (2013.01); *H04L 63/0464* (2013.01); *H04L 67/1097* (2013.01); *H04L 67/2847* (2013.01); *H04L 67/2852* (2013.01);

(Continued)

(58) Field of Classification Search
CPC ............. H04L 67/2842; H04L 67/1097; H04L 12/2834; H04L 63/0428; H04L 63/0464; H04L 29/08801; H04L 29/08891
USPC ................ 709/217, 218, 219, 203, 212, 213
See application file for complete search history.

(56) References Cited

U.S. PATENT DOCUMENTS

6,138,162 A    10/2000  Pistriotto et al.
6,505,254 B1    1/2003  Johnson et al.
(Continued)

FOREIGN PATENT DOCUMENTS

WO       2016/048795 A1    3/2016

OTHER PUBLICATIONS

International Search Report and Written Opinion of the International Searching Authority for PCT Application No. PCT/US2015/050739, dated Feb. 23, 2016, 18 pages.

(Continued)

*Primary Examiner* — Mohamed A Wasel
*Assistant Examiner* — Marshall M McLeod
(74) *Attorney, Agent, or Firm* — Kilpatrick Townsend & Stockton LLP

(57) ABSTRACT

A routing device capable of performing application layer data caching is described. Application data caching at a routing device can alleviate the bottleneck that an application data host may experience during high demands for application data. Requests for the application data can also be fulfilled faster by eliminating the network delays for communicating with the application data host. The techniques described can also be used to perform analysis of the underlying application data in the network traffic transiting though a routing device.

30 Claims, 19 Drawing Sheets

Time = 11:36 am

Application Data Request Log 400

| Req. No. 401 | Network Resource Identifier 402 | Requester ID 404 | Timestamp 406 | Data Digest 408 |
|---|---|---|---|---|
| 1 | xyz.com | client 311 | 05-10-2014, 11:02 am | 0x3FA2 |
| 2 | xyz.com | client 312 | 05-10-2014, 11:02 am | 0x3FA2 |
| 3 | xyz.com | client 314 | 05-10-2014, 11:03 am | 0x3FA2 |
| 4 | xyz.com | client 315 | 05-10-2014, 11:10 am | - |
| 5 | xyz.com | client 316 | 05-10-2014, 11:32 am | - |
| 6 | xyz.com | client 311 | 05-10-2014, 11:36 am | 0x4F55 |

Application Data Cache Table 450

| Network Resource Identifier 452 | Cached? 455 | Time-to-Live 457 | Memory Location 453 |
|---|---|---|---|
| xyz.com | N | - | - |

(52) U.S. Cl.
CPC .......... *H04L 67/2885* (2013.01); *H04L 67/32* (2013.01); *H04L 63/0471* (2013.01); *H04L 63/168* (2013.01)

(56) References Cited

U.S. PATENT DOCUMENTS

| | | | |
|---|---|---|---|
| 7,209,703 | B1 | 4/2007 | Yarkosky |
| 7,571,217 | B1 | 8/2009 | Saxena |
| 7,904,951 | B1 | 3/2011 | Ebrahimi et al. |
| 7,948,951 | B2 | 5/2011 | Wentink |
| 8,131,209 | B1 | 3/2012 | Chen et al. |
| 8,352,570 | B2 | 1/2013 | Saxena |
| 8,904,093 | B1 | 12/2014 | Nishimoto et al. |
| 9,191,374 | B1 | 11/2015 | Kim |
| 9,509,764 | B1 * | 11/2016 | Kolam ............... H04L 67/2852 |
| 9,654,357 | B2 | 5/2017 | Fox et al. |
| 2001/0023476 | A1 | 9/2001 | Rosenzweig |
| 2002/0016911 | A1 | 2/2002 | Chawla et al. |
| 2002/0032772 | A1 | 3/2002 | Olstad et al. |
| 2002/0048269 | A1 | 4/2002 | Hong |
| 2002/0103974 | A1 | 8/2002 | Giacomini et al. |
| 2003/0065743 | A1 | 4/2003 | Jenny et al. |
| 2003/0225885 | A1 | 12/2003 | Rochberger |
| 2004/0015725 | A1 | 1/2004 | Boneh et al. |
| 2004/0064590 | A1 | 4/2004 | Starr et al. |
| 2005/0138033 | A1 | 6/2005 | Katta et al. |
| 2006/0015570 | A1 * | 1/2006 | Khemani ............ H04L 63/0485 709/217 |
| 2007/0140140 | A1 | 6/2007 | Feeley et al. |
| 2007/0168405 | A1 | 7/2007 | Pomerantz |
| 2008/0132164 | A1 | 6/2008 | Bugenhagen et al. |
| 2008/0201331 | A1 * | 8/2008 | Eriksen ............ G06F 17/30902 |
| 2009/0158362 | A1 | 6/2009 | Kajos |
| 2009/0222624 | A1 * | 9/2009 | Giacomini ......... G06F 12/0888 711/125 |
| 2009/0303034 | A1 | 12/2009 | Abedi |
| 2010/0121940 | A1 | 5/2010 | Reeser |
| 2012/0320824 | A1 | 12/2012 | Bari et al. |
| 2013/0007186 | A1 | 1/2013 | Liu et al. |
| 2013/0204961 | A1 | 8/2013 | Fliam |
| 2013/0227048 | A1 | 8/2013 | Xie et al. |
| 2014/0119407 | A1 | 5/2014 | Miller |
| 2014/0149533 | A1 | 5/2014 | Bergman et al. |
| 2014/0188922 | A1 | 7/2014 | Poyhonen et al. |
| 2014/0189034 | A1 | 7/2014 | Draznin et al. |
| 2014/0250230 | A1 | 9/2014 | Brueck et al. |
| 2014/0254471 | A1 | 9/2014 | Fang et al. |
| 2015/0058488 | A1 * | 2/2015 | Backholm ............ H04L 61/1511 709/226 |
| 2015/0098459 | A1 | 4/2015 | Lee et al. |
| 2015/0227517 | A1 | 8/2015 | Lymberopoulos et al. |
| 2015/0358067 | A1 | 12/2015 | Zhang et al. |
| 2015/0373140 | A1 | 12/2015 | Haenel et al. |
| 2016/0088113 | A1 | 3/2016 | Kim |
| 2016/0088114 | A1 | 3/2016 | Kim |
| 2016/0183162 | A1 | 6/2016 | Jeong et al. |
| 2016/0183271 | A1 | 6/2016 | Zhou et al. |
| 2017/0181006 | A1 | 6/2017 | Vardarajan et al. |
| 2017/0272963 | A1 | 9/2017 | Rengarajan et al. |

OTHER PUBLICATIONS

First Action Interview Pilot Program Pre-Interview Communication for U.S. Appl. No. 14/493,075 dated Dec. 10, 2014, 6 pages.
Final Office Action for U.S. Appl. No. 14/493,075 dated Mar. 10, 2015, 19 pages.
Non-Final Office Action dated Jun. 2, 2017 for U.S. Appl. No. 14/493,199; 12 pages.
Non-Final Office Action dated Jan. 12, 2017 for U.S. Appl. No. 14/493,205; 10 pages.
Final Office Action dated Aug. 25, 2017 for U.S. Appl. No. 14/493,205; 12 pages.
Notice of Allowance dated Jul. 7, 2015 for U.S. Appl. No. 14/493,075; 18 pages.

\* cited by examiner

Time = 11:02 am

| Application Data Request Log 400 | | | | |
|---|---|---|---|---|
| Req. No. 401 | Network Resource Identifier 402 | Requester ID 404 | Timestamp 406 | Data Digest 408 |
| 1 | xyz.com | client 311 | 05-10-2014, 11:02 am | 0x3FA2 |
| 2 | xyz.com | client 312 | 05-10-2014, 11:02 am | 0x3FA2 |

| Application Data Cache Table 450 | | | |
|---|---|---|---|
| Network Resource Identifier 452 | Cached? 455 | Time-to-Live 457 | Memory Location 453 |
| xyz.com | N | - | - |

FIG. 4

Time = 11:03 am

| Application Data Request Log 400 | | | | |
|---|---|---|---|---|
| Req. No. 401 | Network Resource Identifier 402 | Requester ID 404 | Timestamp 406 | Data Digest 408 |
| 1 | xyz.com | client 311 | 05-10-2014, 11:02 am | 0x3FA2 |
| 2 | xyz.com | client 312 | 05-10-2014, 11:02 am | 0x3FA2 |
| 3 | xyz.com | client 314 | 05-10-2014, 11:03 am | 0x3FA2 |

| Application Data Cache Table 450 | | | |
|---|---|---|---|
| Network Resource Identifier 452 | Cached? 455 | Time-to-Live 457 | Memory Location 453 |
| xyz.com | Y | 30 min. | 0x2800 |

FIG. 5

Time = 11:08 am

| Application Data Request Log 400 | | | | |
|---|---|---|---|---|
| Req. No. 401 | Network Resource Identifier 402 | Requester ID 404 | Timestamp 406 | Data Digest 408 |
| 1 | xyz.com | client 311 | 05-10-2014, 11:02 am | 0x3FA2 |
| 2 | xyz.com | client 312 | 05-10-2014, 11:02 am | 0x3FA2 |
| 3 | xyz.com | client 314 | 05-10-2014, 11:03 am | 0x3FA2 |

| Application Data Cache Table 450 | | | |
|---|---|---|---|
| Network Resource Identifier 452 | Cached? 455 | Time-to-Live 457 | Memory Location 453 |
| xyz.com | Y | 25 min. | 0x2800 |

FIG. 6

Time = 11:10 am

| Application Data Request Log 400 | | | | |
|---|---|---|---|---|
| Req. No. 401 | Network Resource Identifier 402 | Requester ID 404 | Timestamp 406 | Data Digest 408 |
| 1 | xyz.com | client 311 | 05-10-2014, 11:02 am | 0x3FA2 |
| 2 | xyz.com | client 312 | 05-10-2014, 11:02 am | 0x3FA2 |
| 3 | xyz.com | client 314 | 05-10-2014, 11:03 am | 0x3FA2 |
| 4 | xyz.com | client 315 | 05-10-2014, 11:10 am | - |

| Application Data Cache Table 450 | | | |
|---|---|---|---|
| Network Resource Identifier 452 | Cached? 455 | Time-to-Live 457 | Memory Location 453 |
| xyz.com | Y | 30 min. | 0x2800 |

FIG. 7

Time = 11:20 am

| Application Data Request Log 400 ||||| 
|---|---|---|---|---|
| Req. No. 401 | Network Resource Identifier 402 | Requester ID 404 | Timestamp 406 | Data Digest 408 |
| 1 | xyz.com | client 311 | 05-10-2014, 11:02 am | 0x3FA2 |
| 2 | xyz.com | client 312 | 05-10-2014, 11:02 am | 0x3FA2 |
| 3 | xyz.com | client 314 | 05-10-2014, 11:03 am | 0x3FA2 |
| 4 | xyz.com | client 315 | 05-10-2014, 11:10 am | - |

| Application Data Cache Table 450 ||||
|---|---|---|---|
| Network Resource Identifier 452 | Cached? 455 | Time-to-Live 457 | Memory Location 453 |
| xyz.com | Y | 20 min. | 0x2800 |

FIG. 8

Time = 11:32 am

| Application Data Request Log 400 |||||
|---|---|---|---|---|
| Req. No. 401 | Network Resource Identifier 402 | Requester ID 404 | Timestamp 406 | Data Digest 408 |
| 1 | xyz.com | client 311 | 05-10-2014, 11:02 am | 0x3FA2 |
| 2 | xyz.com | client 312 | 05-10-2014, 11:02 am | 0x3FA2 |
| 3 | xyz.com | client 314 | 05-10-2014, 11:03 am | 0x3FA2 |
| 4 | xyz.com | client 315 | 05-10-2014, 11:10 am | - |
| 5 | xyz.com | client 316 | 05-10-2014, 11:32 am | - |

| Application Data Cache Table 450 ||||
|---|---|---|---|
| Network Resource Identifier 452 | Cached? 455 | Time-to-Live 457 | Memory Location 453 |
| xyz.com | Y | 8+5 = 13 min. | 0x2800 |

FIG. 9

Time = 11:36 am

| Application Data Request Log 400 | | | | |
|---|---|---|---|---|
| Req. No. 401 | Network Resource Identifier 402 | Requester ID 404 | Timestamp 406 | Data Digest 408 |
| 1 | xyz.com | client 311 | 05-10-2014, 11:02 am | 0x3FA2 |
| 2 | xyz.com | client 312 | 05-10-2014, 11:02 am | 0x3FA2 |
| 3 | xyz.com | client 314 | 05-10-2014, 11:03 am | 0x3FA2 |
| 4 | xyz.com | client 315 | 05-10-2014, 11:10 am | - |
| 5 | xyz.com | client 316 | 05-10-2014, 11:32 am | - |
| 6 | xyz.com | client 311 | 05-10-2014, 11:36 am | 0x4F55 |

| Application Data Cache Table 450 | | | |
|---|---|---|---|
| Network Resource Identifier 452 | Cached? 455 | Time-to-Live 457 | Memory Location 453 |
| xyz.com | N | - | - |

FIG. 10

CONTEXTUAL ROUTING DEVICE CACHING

CROSS-REFERENCES TO RELATED APPLICATIONS

This application is a continuation of U.S. patent application Ser. No. 14/493,075 filed Sep. 22, 2014, entitled "Routing Device Data Caching," the entirety of which is hereby incorporated by reference for all purposes.

BACKGROUND

Networking devices can be used at a residence, office, school, or other establishment to provide any number of computing devices with access to data such as content on the internet. In some scenarios, multiple computing devices may request the same content. For example, in a classroom setting, a teacher may direct the students to access content at a particular web page as part of a lesson plan. In such a scenario, the web server hosting the content may receive many requests for the same content in a relatively short period of time, creating a bottleneck at the web server. As another example, when a new television program becomes available on the internet, the web server hosting the television program may receive thousands or millions of requests from computing devices to download or stream the television program during the first few days of release. Due to the large number of requests received in a relatively short period of time, the web server may not be able to service all of the requests, or may not be able to respond to all of the requests in a timely manner resulting in delays in delivery of requested content to the computing devices.

BRIEF SUMMARY

According to some embodiments, a computer-implemented method includes receiving, on a routing device, a network resource identifier to request application data, receiving the application data corresponding to the network resource identifier, deriving a data digest from the received application data, and associating the data digest with the network resource identifier. The method may further include comparing the network resource identifier to previously received network resource identifiers, comparing the data digest to previous data digests associated with the previously received network resource identifiers, and determining whether to cache the application data in an application data cache of the routing device based on at least the comparison of the network resource identifier and the comparison of the data digest.

According to some embodiments, a routing device may include an application data cache, one or more data processors, and a non-transitory computer readable storage medium containing instructions, which when executed on the one or more data processors, cause the one or more processors to perform operations that may include receiving a network resource identifier to request application data. The operations may further include receiving the application data corresponding to the network resource identifier, and deriving a data digest from the received application data, associating the data digest with the network resource identifier. The operations may also include comparing the network resource identifier to previously received network resource identifiers, comparing the data digest to previous data digests associated with the previously received network resource identifiers, and determining whether to cache the application data in the application data cache based on at least the comparison of the network resource identifier and the comparison of the data digest.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

FIG. 4 illustrates an example of an application data request log and an example of an application data cache table at a first point in time, according to some embodiments.

FIG. 5 illustrates an example of an application data request log and an example of an application data cache table at a second point in time, according to some embodiments.

FIG. 6 illustrates an example of an application data request log and an example of an application data cache table at a third point in time, according to some embodiments.

FIG. 7 illustrates an example of an application data request log and an example of an application data cache table at a fourth point in time, according to some embodiments.

FIG. 8 illustrates an example of an application data request log and an example of an application data cache table at a fifth point in time, according to some embodiments.

FIG. 9 illustrates an example of an application data request log and an example of an application data cache table at a sixth point in time, according to some embodiments.

FIG. 10 illustrates an example of an application data request log and an example of an application data cache table at a seventh point in time, according to some embodiments.

DETAILED DESCRIPTION

Figure 1:
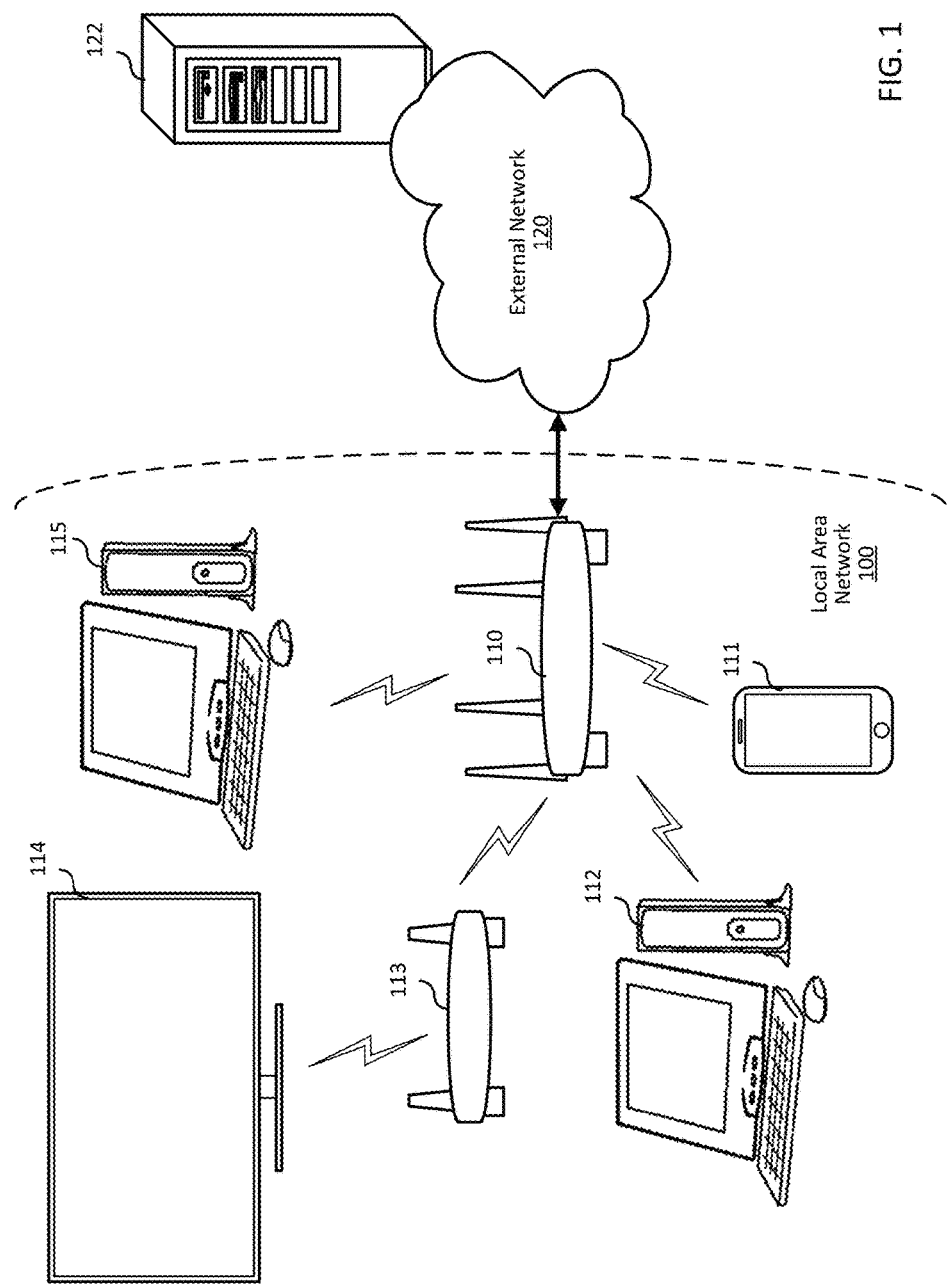
FIG. 1 illustrates an example of a local area network, according to some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A local area network may be set up to provide users with access to various devices within the network. The local area network may include one or more routing devices that provide users with access to the networked devices. The one or more routing devices may also provide the users and the networked devices with access to one or more external networks, such as a cloud network, the internet, and/or other wide area networks.

FIG. 1 illustrates an example of a local area network 100 according to some embodiments. Local area network 100 may include a wireless network, a wired network, or a combination of wired and wireless networks. A wireless network may include any wireless interface or combination of wireless interfaces (e.g., Zigbee, Bluetooth, WiFi, IR, cellular, LTE, WiMax, or the like). A wired network may include any wired interface (e.g., fiber, ethernet, powerline ethernet, ethernet over coaxial cable, digital signal line (DSL), or the like). The wired and/or wireless networks may be implemented using various networking devices such as routing devices (e.g., routers, access points, bridges, gateways, or the like, to connect devices in the local area network 100. For example, local area network 100 may include routing device 110 and routing device 113. In the example shown, routing device 110 may be a wireless router that provides connectivity between local area network 100 and an external network 120, and routing device 113 can be a repeater or access point to extend the wireless range of routing device 110. Examples of a routing device that can be part of a local area network may include a router, a gateway, an access point, a repeater, a network bridge, a network switch, a network hub, a modem, a base station, or, other networking device that can provide network access among one or more computing devices and/or external networks, or any combination thereof.

Local area network 100 may include a number of computing devices (may also be referred to as client devices). For example, local area network 100 may include one or more computing devices such as mobile phone 111, computers 112 and 115, and/or smart television 114. Examples of a computing device that can be part of a local area network may include a personal computing device (e.g., a laptop computer, a home computer, a tablet, a personal digital assistant (PDA), a wearable computing device, etc.), a media device (e.g., a set top box, a smart television, a gaming console, a media playback device such as a radio, an audio player, a projector, a DVD player, etc.), a smart appliance (e.g., a smart refrigerator, a smart oven, a smart washing machine, etc.), and/or other types of internet ready device.

Routing device 110 and/or 113 can be utilized to provide communication capabilities to computing devices 111, 112, 114, and/or 115 via radio signals or wired connections in order to provide communication, location, and/or other services to the devices. While two routing devices 110 and 113 are shown in FIG. 1, in some embodiments, any one or more number of routing devices may be present within the local area network 100. The network access provided by routing device 110 and/or 113 may be of any type of network that can support data communications using any of a variety of commercially-available protocols. For example, routing device 110 and/or 113 may provide wireless communication capabilities for the local area network 100 using particular communications protocols, such as WiFi (e.g., IEEE 802.11 family standards, or other wireless communication technologies, or any combination thereof). Using the communications protocol(s), routing device 110 and/or 113 may transmit and receive radio frequencies with which wireless enabled devices in local area network 100 can communicate.

It should be appreciated that local area network 100 may have other components than those depicted. Further, the embodiment shown in the figure is only one example of a local area network that may incorporate an embodiment of the invention. In some embodiments, local area network 100 may have more or fewer components than shown in the figure, may combine two or more components, or may have a different configuration or arrangement of components.

Routing device 110 and/or 113 may also provide any of the computing devices in local area network 100 with access to one or more external networks 120, such as a cloud network, the internet, and/or other wide area networks. External network may include one or more application data hosts 122 that hosts content data. In some embodiments, application data host 122 can be a server computer in an external network accessible via the internet. In some embodiments application data host 122 can be a server computer that is part of a cloud infrastructure system. In some embodiments, the computing devices, servers, and/or systems that make up the external network 120 are different from the local area network's own on-premises computing devices, servers, and/or systems.

In some embodiments, a secure connection can be used between external network 120 and one or more of the computing devices 111, 112, 114, and 115 to facilitate communications between external network 120 and local area network 100. For example, communications between external network 120 and computing devices 111, 112, 114, and 115 may be supported using a Hypertext Transfer Protocol Secure (HTTPS) protocol, or the like. Other types of communication protocols, such as Transmission Control Protocol (TCP), Hypertext Transfer Protocol (HTTP) protocol, or the like can also be used.

In some embodiments, more than one computing device in local area network may request the same data content (also referred to herein as "application data") such as web pages, images, movies, audio media, data files, or other types of application data available from external network 120. The computing devices may request the data content based on instructions or commands provided manually by a user of the respective computing device, and/or automatically according to a programmed schedule. In some scenarios, the requests for data content by the computing devices may occur within a relatively short period of time. For example, the requests may occur within a minute, ten minutes, thirty minutes, an hour, a day, or a week, etc. Such a scenario may happen, for example, if a new episode of a weekly television show first becomes available on external network 120. Statistics have shown that most number of requests for accessing (e.g., streaming, downloading, etc.) newly available content occur within the first few days of the content becoming available, and tapers off thereafter. Another example where multiple requests for the same data content may occur within a short period of time can be in a classroom setting where the instructor instructs students in the classroom to access web content all at once as part of a lesson plan. In order to reduce the load at application data host 122 and to alleviate the burden on application data host 122, the techniques described herein can be used to cache data content at one or more routing devices such that the requested data content can be provided to the computing devices without having to forward the request to server 122 each time a request is made.

In some embodiments, the caching techniques described herein can be performed in a multi-tiered network. For example, in the classroom context, the caching techniques can be performed at a school district level to provide cached data content to schools within an entire school district, at a particular school to provide cached data content to classrooms in the school, or at a classroom level to provide cached data content to student computers in a classroom. As another example, the caching techniques can be performed at an internet service locality such as a city to provide cached data content to an entire region, at a particular building to provide cached data content to residences or business in the building, or at an individual residence or business level to provide cached data content to individual computers within the residence or business.

Figure 2:
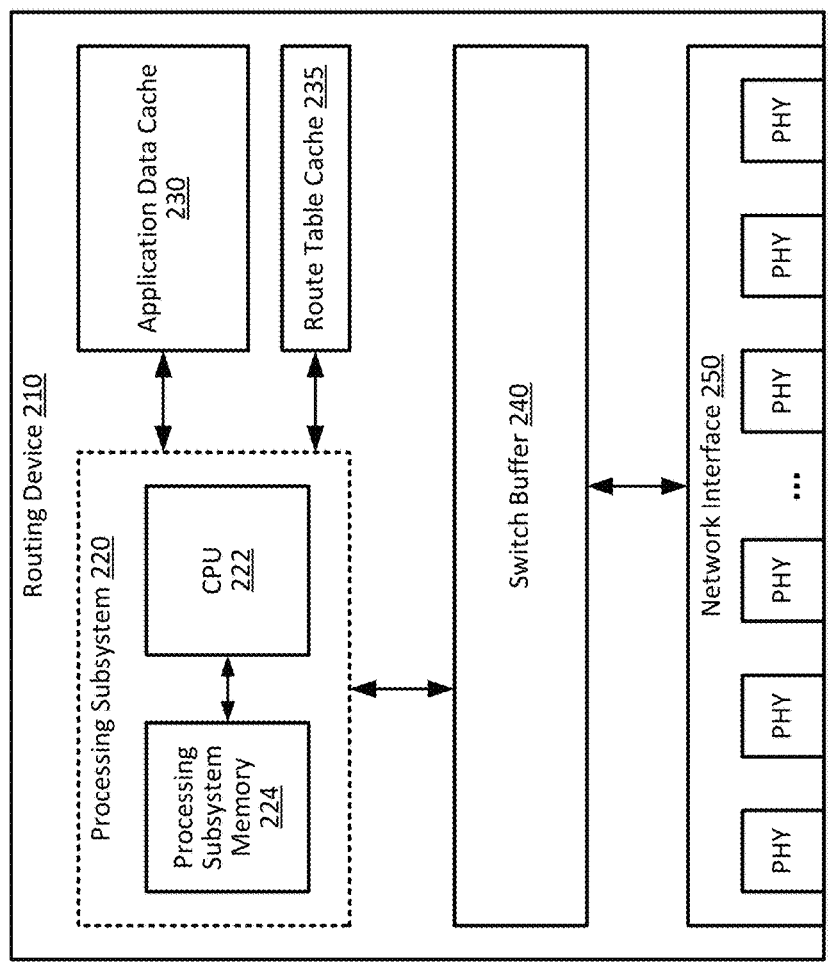
FIG. 2 illustrates a block diagram of a routing device, according to some embodiments.

FIG. 2 illustrates a routing device 210 (e.g., routing device 110 or 113 in FIG. 1) according to some embodiments. Routing device 210 may be a router, a gateway, an access point, a repeater, a network bridge, a network switch, a network hub, a modem, a base station, other networking device that can provide network access to one or more computing devices and/or external networks, or any combination thereof. For example, routing device 210 may be routing device 110 or 113 shown in FIG. 1, according to some embodiments. Routing device 210 may include a processing subsystem 220, one or more network interfaces 250, and an application data cache 230. In some embodiments, routing device 210 may include a switch buffer 240 and a route table cache 235.

Processing subsystem 202 can be implemented as one or more integrated circuits, e.g., one or more processors and/or controllers 222, and/or one or more processing subsystem memories 224. In operation, processing system 220 can control the operation of routing device 210. In some embodiments, processing subsystem 220 can execute a variety of programs and/or processes in response to program code or instructions, and can maintain multiple concurrently executing programs or processes. At any given time, some or all of the program code or instructions to be executed by the one or more processors/controllers 222 can be resident in processing subsystem 220, for example, in processing subsystem memory 224. Each processor/controller 222 can be implemented as a general purpose processor, a digital signal processor, an application specific integrated circuit, a field programmable gate array, analog circuit, digital circuit, and/or combinations thereof. The one or more processors/ controllers 222 are primarily used to process network traffic (e.g., IP packets) received by routing device 210 and to determine how to route the network traffic to the intended destination. In some embodiments, the one or more processors/controllers 222 can also be used to determine whether application data received as part of the network traffic are cached in routing device 210.

Processing subsystem memory 224 can be implemented as non-volatile memory, volatile memory, other non-transitory storage medium, or a combination of media, and/or a combination thereof. Non-volatile memory can be implemented, for example, using magnetic storage media, flash memory, non-volatile random access memory (NVRAM), erasable programmable read-only memory (EPROM), electrically erasable programmable read-only memory (EEPROM), programmable read only memory (PROM), or other read-only memory or non-volatile memory storage technologies. Non-volatile memory can be used, for example, to store the firmware code and/or an operating system image of routing device 210, which can be used during operation to perform one or more functionalities of routing device 210. In some embodiments, non-volatile memory 224 may also be used to store a startup configuration of routing device 210. Volatile memory can be implemented, for example, using dynamic random-access memory (DRAM), static random-access memory (SRAM), or other random access memory or volatile memory storage technologies. Random access memory 226 can be used, for example, to load the operating system during run-time and to store run-time data of routing device 210 to perform one or more functionalities of routing device 210.

Network interface 250 can include one or more internal network interfaces and/or one or more external network interfaces to facilitate exchange of communications within an internal network (e.g., a local area network, etc.), an external network, and/or between an internal network and an external network. Each network interface 250 can be implemented using one or more physical layer (PHY) interface components. Each PHY can represent a physical port on routing device 210 and may be assigned to one or more logical ports. Each PHY provides an interface to a physical medium to transport network traffic data, and is used to convert signals transporting the network traffic data from a physical transport medium protocol to packetized data (also referred to as packets or data packets) that processor subsystem 202 can process, or vice versa. For example, a WiFi capable PHY may convert WiFi radio frequency signals adhering to IEEE 802.11 family standards into packetized data (e.g., IP packets), and/or vice versa. The physical medium used for transporting network traffic data can be, for example, optical fiber, cable or wire, radio frequency, infrared, and/or other communication medium that can be used to send and receive data. For example, routing device 210 may include any combination of one or more Ethernet PHYs, cable or phone line PHYs, wireless PHYs (e.g., WiFi PHY, etc.), fiber channel PHYs, universal serial bus (USB) PHYs, etc. For example, in some embodiments, routing device 210 may include an external network interface including a cable or phone line PHY to connect routing device 210 to an external network (e.g., the internet, a cloud network, etc.) via a cable or digital subscriber line (DSL) connection, and an internal network interface including at least one wireless PHY to provide wireless connectivity (e.g., via WiFi, Bluetooth, Zigbee, Ultra-Wideband (UWB), etc.) to one or more computing devices in a local area network, and one or more Ethernet PHYs to provide wired connectivity to one or more computing devices in a local area network.

Routing device 210 may also include one or more antenna and/or suitable radio circuitry coupled to one or more wireless PHYs to facilitate wireless communications with other devices. For example, routing device 210 may include a 2.4 GHz antenna, a 5 GHz antenna, and/or the like, that can transmit and receive WiFi communications signals. In some embodiments, routing device 210 may include other types of antennas that can communicate Bluetooth signals, Zigbee signals, Ultra-Wideband (UWB) signals, and/or the like. In some embodiments, routing device 210 may include multiple antennas for communicating different types of communication signals. As an example, routing device 210 may include both a 2.4 GHz antenna and a 5 GHz antenna.

According to some embodiments, routing device 210 may include switch buffer 240 to temporarily store packetized data converted by the PHYs received on one or more network interfaces 250. The packetized data is temporarily stored in switch buffer 240 to allow processor subsystem 220 to determine where to send the received packetized data (e.g., the next-hop destination). In some embodiments, the packetized data stored in switch buffer 240 is transmitted from routing device 210 as soon as processor subsystem 220 determines where to send the packetized data, and switch buffer 240 does not retain the packetized data once the packetized data is transmitted. The packetized data temporarily stored in switch buffer 240 may be transmitted just once from routing device 210, because the packetized data temporarily stored in switch buffer 240 is overwritten immediately or shortly after the packetized data is transmitted. In some embodiments, the packets temporarily stored in switch buffer 240 may be stored with at least some portion of the transport service headers of the packets such as OSI layer 4 transport headers (e.g., TCP, UDP headers). Depending on the type of routing device that routing device 210 is, the packets may additionally be temporarily stored in switch buffer 230 with at least some portion of the packets' OSI layer 3 network headers (e.g., IP headers), OSI layer 2 data link headers (e.g., Ethernet headers), and/or OSI layer 1 physical addressing headers (e.g., MAC headers), etc. It should be noted that in some embodiments, the packetized data may be received on a secure channel and may have payloads encrypted according to a session key associated with the secure channel. In such scenarios, the encrypted payloads remain encrypted while it is being temporarily stored in switch buffer 240.

According to some embodiments, routing device 210 may include route table cache 235 to store information about the network topology surround routing device 210. The information stored in route table cache 235 may include information such as destination addresses, next-hop addresses to reach the intended destination, and network cost metrics for sending a packet along a particular network path. Route table cache 235 can be populated using routing and network discovery protocols. The information stored in route table cache 235 is used by processor subsystem 220 to determine how to route received data to their intended destinations. For example, routing device 210 may receive a packet with a particular destination address. Processor subsystem 220 may examine the destination address, and compare the destination address against the entries in route table cache 235 to determine the next-hop destination that this packet should be sent to such that the packet can reach its intended destination. The network cost metrics can be used to select the most effective path (e.g., least number of hops) to route the packet to its intended destination. Processor subsystem 220 can then determine which port is connected to the next-hop destination, and send the packet from the switch buffer 240 out to the appropriate port and network interface to reach the next hop destination.

In some embodiments, routing device 210 may also include application data cache 230. Application data cache 230 is used to store application data received by routing device 210 that is likely to be requested again in the near future. The application data may be received in the payloads of packets sent to routing device 210 from an application data host (e.g., a server) that is hosting the requested application data. For example, a computing device (may also be referred to herein as a "client device") in a local area network connected to routing device 210 may send a request to routing device 210 to request application data such as a web page from an application data host such as a web server in an external network. In response to receiving this request, routing device 210 may forward the request for the application data to the web server. The web server may respond by sending the requested application data (e.g., web page content) in the payloads of data packets to routing device 210, and routing device 210 may forward the data packets containing the application data to the computing device.

In some embodiments, if routing device 210 receives multiple requests for the same applications data (e.g., same web page), this may indicate that there is a high likelihood that more requests for the same application data may occur in the near future. Thus, rather than forwarding each subsequent request to the web server, routing device 210 can contextually cache the application data in application data cache 230 such that subsequent requests can be serviced by routing device 210 without having to contact the web server again. For example, in some embodiments, processor subsystem 220 may copy the payload portions of the received packets containing the application data from the temporary storage in switch buffer 240 to application data cache 230 such that the application data is retained in application data cache 230 for future transmission. Once the application data is cached, each subsequent request for the application data from a computing device can be serviced by routing device 210 by retrieving the application data from application data cache 230, and sending the retrieved application data to the computing device. In this manner, the subsequent requests for the application data need not be forwarded to the web server, and the network traffic that the web server has to process can be reduced. Furthermore, by eliminating the round trip delay of the communications between routing device 210 and the application data host, the requested application data can be provided to the computing device faster.

In contrast to switch buffer 240, the application data being stored in application data cache 230 is retained in application data cache 230 for an extended period of time for future transmission even after the application data has been transmitted from routing device 210. Furthermore, the data stored in application data cache 230 is stored as OSI layer 7 application data without any of the transport service headers. In other words, processor subsystem 220 may remove the headers of the packets transporting the application data before storing the application data in application data cache 230. In some embodiments, if the application data is received on a secure channel such that the received packets containing the application data are encrypted according to a session key associated with the secure channel, the application data may be decrypted prior to being stored in application data cache 230. In some embodiments, to prevent unauthorized access to the application data in application data cache 230, the application data can be re-encrypted, for example, using a separate key that is different than the secure channel session key before storing the application data in application data cache 230.

In some embodiments, to provide adequate storage memory to cache sufficient amounts of application data, routing device 210 may include a memory expansion port. The memory expansion port may include, for example, a USB or memory card interface to connect an external storage device (e.g., an external flash drive, an external hard drive, a memory card, etc.) to expand the storage capacity of application data cache 230. In some embodiments, application data cache 230 can be implemented entirely on an external storage device.

Figure 3:
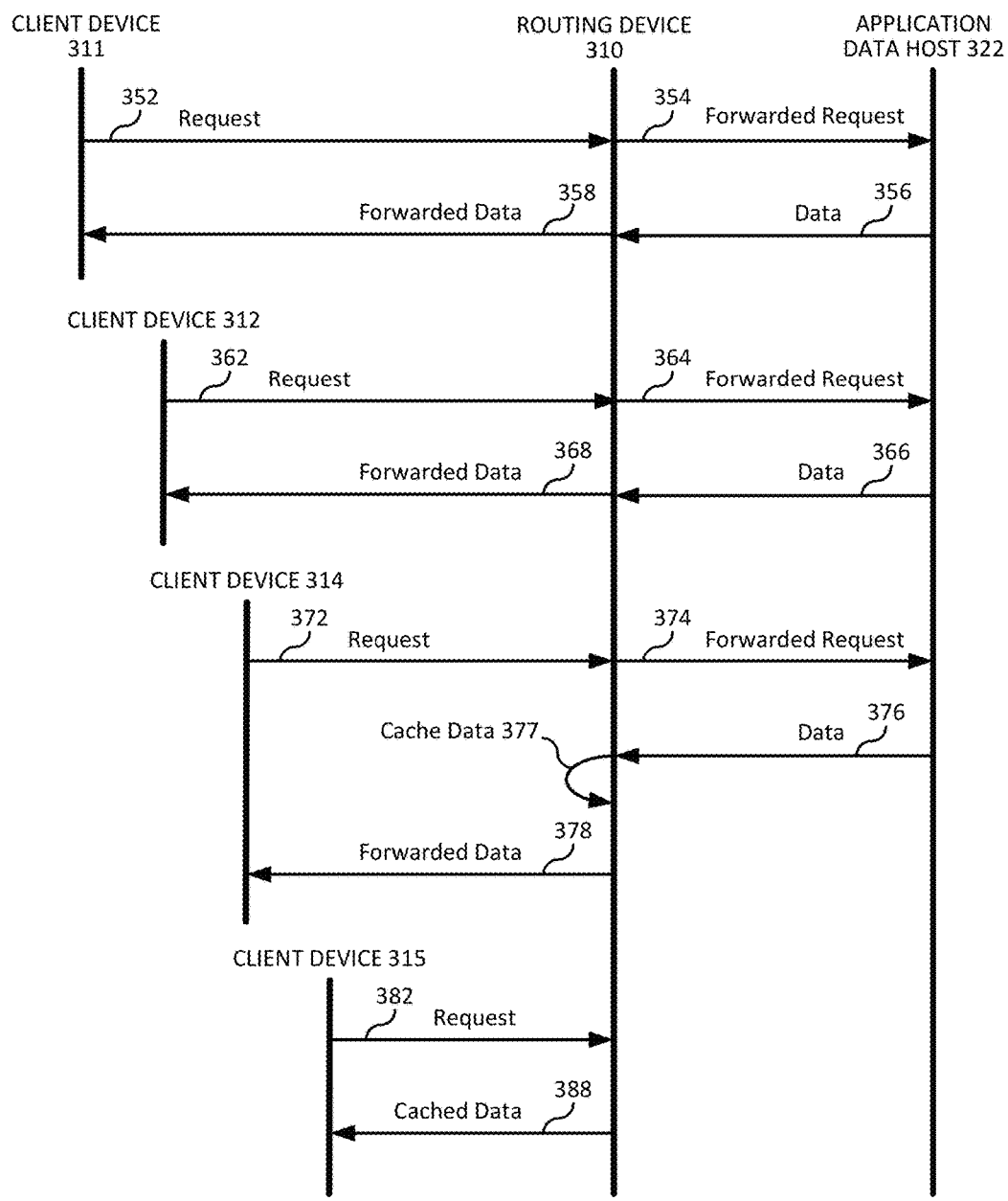
FIG. 3 shows a communication flow diagram illustrating the operation of a routing device, according to some embodiments.

FIG. 3 shows a communication flow diagram illustrating the operation of a routing device 310, according to some embodiments. As shown, routing device 310 may communicate with multiple client devices 311, 312, 314, and/or 315 and an application data host 322. Routing device 310 may be, for example, routing device 110 shown in FIG. 1 or routing device 210 shown in FIG. 2. Any of client devices 311, 312, 314, or 315 may be a computing device such as any of computing devices 111, 112, 114, or 155 shown in FIG. 1, or other network or internet ready computing device. Client devices 311, 312, 314, and/or 315 may reside in a local area network. Application data host 322 can be a server or other suitable computers that can host network accessible application data. Application data host 322 may reside in an external network (e.g., internet, cloud network, wide area network, etc.). Communications between any of client devices 311, 312, 314, or 315 in the local area network and application data host 322 in the external network may be facilitated by routing device 310.

Referring to FIG. 3, in some embodiments, client device 311 may send a request 352 for application data hosted by application data host 322 to routing device 310. The application data being requested can be, for example, web content (e.g., a web page, etc.), file content (e.g. document, image, software, etc.), media content (e.g., song, audio clip, image, photo, video clip, movie, etc.), or other network accessible data usable by computing device 311. In some embodiments, request 352 may include a network resource identifier or information derived from a network resource identifier to identify the particular application data host that is hosting the application data. The network resource identifier can be, for example, a uniform resource identifier (e.g., a uniform resource locator such as a web address), an IP address, or other information that routing device 310 can use to direct request 352 to the appropriate application data host 322. In some embodiments, request 352 may correspond to a Hypertext Transfer Protocol (HTTP) or Hypertext Transfer Protocol Secure (HTTPS) request.

Request 352 may be sent by computing device 311, for example, in response computing device 311 receiving a user input, for example, when a user enters a network resource identifier on a software application running on computing device 360. Examples of such a software application may include an internet browser, media player, file system manager, or other applications that can be used to access a network. In some embodiments, request 352 may be sent by computing device 311 automatically according to a programmed schedule.

When routing device 310 receives request 352 to request application data from application data host 322, routing device 310 may use the network resource identifier of request 352 to determine where to forward request 352. For example, when the network resource identifier is a URL, routing device 310 may determine the IP address associated with the URL by querying a Domain Name System (DNS) server. Routing device 310 may then send request 352 as a forwarded request 354 towards application data host 322 using the IP address associated with the URL as a destination address. It should be noted that forwarded request 354 may traverse through any number of additional network elements before reaching application data host 322. In response to receiving forwarded request 354, application data host 322 may send the requested application data 356 to routing device 310. When routing device 310 receives the requested application data 356, routing device 310 forwards application data 356 as forwarded application data 358 to client device 311.

In the example shown, request 352 may be the first request for this particular application data (e.g., a particular web page) that routing device 310 has received in a while, and as such, routing device 310 may determine not to cache application data 356. Nevertheless, routing device 310 may log request 352 and/or its network resource identifier to track the number of requests that routing device 310 receives for this particular application data. In some embodiments, routing device 310 may also track the application data corresponding to request 352 received by routing device 310, for example, by generating a data digest of application data 356, and associating the data digest with request 352 and/or its network resource identifier.

In this manner, routing device 310 can monitor the requests for application data that routing device 310 receives, such that routing device 310 can perform contextual caching by determining which application data should be cached. In other words, according to some embodiments, routing device 310 does not cache all application data that routing device 310 receives. Rather, routing device 310 monitors the requests and corresponding application data to intelligently cache application data that are likely to be requested again. For example, frequently refreshed data content such as weather or flight status information may not be appropriate application data to cache because a user is likely to be interested in the most recently updated content. These kinds of data are also generally very small and are quick to download. On the other hand, large documents and media files that may be relatively static and may have longer download times can be more appropriate candidates for caching.

In some embodiments, routing device 310 may preemptively cache application data 356 even though request 352 may be the first request for this application data that routing device 310 has received, and routing device 310 may track subsequent requests for application data 356 to intelligently determine whether application data 356 should remain cached based on subsequent demands for application data 356.

Referring back to FIG. 3, routing device 310 may next receive a request 362 from client device 312 to request the same application data as request 352. For example, request 362 may have the same network resource identifier as request 352 such as having the same URI (e.g., same URL or same web address), same IP address, etc. In some embodiments, the network resource identifier for request 362 may have a different value than request 352, but request 362 can still be considered as requesting the same application data as request 352, for example, if the network resource identifiers for requests 352 and 262 map to the same resource at the same IP address. This may occur, for example, if two different URIs (e.g., URLs or web addresses) point to the same IP address (e.g., when two domain names use the same IP address). In some embodiments, request 362 can be considered as requesting the same application data as request 352 if the different IP addresses of requests 352 and 362 map to the same URI (e.g., when one IP address is associated with a primary server hosting the application data for a web address, and the other IP address is associated with a backup server hosting the same application data for the same web address). In some embodiments, the network resource identifier for request 352 may be a URI (e.g., URL or web address), and the network resource identifier for request 362 may be an IP address, and the two requests 352 and 362 may be requesting the same application data if the URI of request 352 maps to the IP address of request 362.

As used herein, a request can be considered to "match" another request if the two requests are requesting the same application data, and a network resource identifier can be considered to "match" another network resource identifier if the two network resource identifiers map to the same application data. For example, in some embodiments, the URI, URL, and/or IP address used to retrieve a particular application data may be different. However, upon retrieving the application data for two or more requests, routing device 310 may analyze the application data as it is being retrieved and forward back to the client devices. In some embodiments, even though the URI, URL, and/or IP address of the requests may be different, routing device 310 can use the analysis of the actual application data being retrieved to determine that the application data for the various requests correspond the same file, and determine to cache the application data for subsequent requests by the same or different clients. For example, routing device 310 may start to retrieve the application data from the remote server and start to compare a first portion of the application data (e.g., first 10%, 20%, 30%, etc.) being retrieved, and compare it to a previously cached file. If that first portion of the application data being retrieved match byte for byte, and other characteristics of the request match a previous request (e.g., file size, etc.), routing device 310 can determine with high confidence that it is the same file and return the cached version.

When routing device 310 receives request 362 from client device 312, routing device 310 may determine that the network resource identifier of request 362 matches a previous network resource identifier (e.g., network resource identifier of previous request 352), i.e. the network resource identifier is being used to request the same application data as a previously received request. Routing device 310 may examine its application data cache to determine if the requested application data was previously cached by routing device 310. Since routing device 310 did not cache the previously received application data 356, routing device 310 forwards request 362 as forwarded request 364 to application data host 322. Application data host 322 may respond by sending the requested application data 366 (which can be the same application data as application data 356) to routing device 310. Routing device 310 then forwards application data 366 as forwarded application data 368 to client device 312.

As with request 352, routing device 310 may generate a data digest for application data 366, and associate the data digest with request 362 and/or its network resource identifier. To determine whether application data 366 should be cached, routing device 310 may compare the network resource identifier of request 362 with previous network resource identifiers of previously received application data requests. Routing device 310 may also compare the data digest generated for application data 368 with previous data digests associated with the previous network resource identifiers (i.e. data digests generated for previously received application data corresponding to the previous network resource identifiers). In some embodiments, routing device 310 may cache application data 366 if the combination of the network resource identifier of request 362 and the data digest generated for application data 366 matches a threshold number of combinations of previous network resource identifiers and their associated data digests. In the example shown in FIG. 3, this threshold number may be two, and since the network resource identifier of request 362 and the associated data digest matches just one previous combination of network resource identifier and data digest (i.e. network resource identifier of request 352 and the associated data digest generated for application data 356), routing device 310 may determine not to cache application data 366.

It should be understood that in some embodiments, the threshold number of matches that may be required to cache a particular application data can be any non-zero number, and that the threshold number need not be the same for all application data. For example, the threshold number of matches to cache the application data of a frequently visited or popular website can be lower that the threshold number of matches for a low traffic website. As another example, the threshold number of matches to cache the application data of a movie can be lower than that of a website, because the network costs to re-download or re-stream a movie may be much higher than reloading a web site. Thus, the threshold number of matches that may be required to cache a particular application data may depend, for example, on one or more factors such as the source or host of the application data, the type of application data, the size of the application data, etc. In some embodiments, the threshold number of matches that may be required to cache a particular application data can be user configurable.

Still referring to FIG. 3, routing device 310 may receive a request 372 from client device 314 to request the same application data as requests 352 and 362. For example, request 372 may have a network resource identifier that matches the network resource identifier of requests 352 and 362. Routing device 310 may examine its application data cache to determine if the requested application data was previously cached by routing device 310. Since routing device 310 did not cache the previously received application data 356 or application data 366, routing device 310 forwards request 372 as forwarded request 374 to application data host 322. Application data host 322 may respond by sending the requested application data 376 (which can be the same application data as application data 356 and 366) to routing device 310. Routing device 310 then forwards application data 376 as forwarded application data 378 to client device 314.

As with requests 352 and 362, routing device 310 may generate a data digest for application data 376, and associate the data digest with request 372 and/or its network resource identifier. To determine whether application data 376 should be cached, routing device 310 may compare the network resource identifier of request 372 with previous network resource identifiers, and compare the data digest generated for application data 376 with previous data digests associated with previous network resource identifiers. As indicated above, in the example shown in FIG. 3, the threshold number of matches to determine that the application data should be cached may be two. Since the network resource identifier of request 372 and the associated data digest matches two previous combinations of network resource identifiers and associated data digests (i.e. network resource identifier of request 352 and the associated data digest generated for application data 356, and network resource identifier of request 362 and the associated data digest generated for application data 366), routing device 310 may determine to cache application data 367 in the application data cache of routing device 310 such that application data 376 is stored in the application data cache at 377 for future transmission.

When routing device 310 receives a subsequent request 382, for example, from client device 315, routing device 310 may determine that request 382 is requesting the same application data as previous requests 352, 362, and/or 372, for example, by determining that the network resource identifier of request 382 matches previous network resource identifiers for requests 352, 362, and/or 372. Routing device 310 then determines if the requested application data is available from the application data cache. Since this application data was previously cached at 377 in the application data cache of routing device 310, instead of forwarding request 382 to application data host 322, routing device 310 retrieves the requested application data from the application data cache, and transmits the cached application data 388 to client device 315 without having to contact application data host 322 again. Hence, by caching the application data at routing device 310, the amount of network traffic that application data host 322 has to process to service subsequent application data requests can be reduced. Furthermore, by eliminating the time it takes to forward the request to application data host 322 and to receive the requested application data from application data host 322, the requested application data can be provided to client device 315 faster.

In some embodiments, to ensure that the cached application data 388 is not "stale" (e.g., out of date), routing device 310 may begin to retrieve the application data from application data host 322 and compare the beginning portion of the newly retrieved application data with the beginning portion of cached application data 388. If the beginning portions match each other, then routing device 310 may stop retrieving application data from application data host 322, and the remainder of the application data is retrieved from application data cache of routing device 310 and forwarded on to client device 315. If the beginning portion of the newly retrieved application data does not match the cached application data 388 to indicate the cached application data 388 may be out of date, then routing device 310 may retrieve the entirety of the application data from application data host 322 and forward it onto 315 while updating the application data cache with this newly retrieved application data.

As described above, in some embodiments, the criteria or conditions to cache the received application data may depend on the number of matching network resource identifier and associated data digest pairs as monitored by routing device 310. In some embodiments, the criteria for caching the received application data may omit the comparison of previous data digests, and rely just on the number of matching previous network resource identifiers. However, comparison of the data digests may be beneficial in that including it as part of the criteria for caching the application data may reduce the likelihood that routing device 310 caches frequently updated application data.

If the requested application data is subject to frequent updates at the application data host, caching the application data may cause a client device to receive outdated application data because the application data stored in the application data cache of routing device 310 may not be the most up-to-date data available from the application data host. For example, some web pages with time sensitive content such as news and weather may be updated frequently (e.g., updated every five to fifteen minutes). In such scenarios, even though two requests may have the same network request identifier (e.g., same URL) to request the same application data (e.g., same web page), if the application data host has updated the application data between the two requests, the application data returned for the first request may be different than the application data returned for the subsequent request. A mismatch between the data digests generated for the two received application data may indicate that the requested application data is subject to frequent updates. Hence, routing device 310 may determine not to cache the application data if the data digest derived from the application data does not match a previous data digest derived from previously received application data corresponding to the same network resource identifier. In such a scenario, a subsequent request for the application data can be forwarded to the application data host to ensure that the most up-to-date application data is provided to the client device.

In some embodiments, over time, routing device 310 may become aware of or become knowledgeable about the nominal frequency with which certain application data is updated at the application data host. Based on this information, routing device 310 may proactively retrieve the application data from the application data host in between the application data updates even if a client device is not explicitly retrieving the application data at that time. This may allow the most up to date application data to be provided to a client device when the client device eventually requests the application data. Thus, in some embodiments, routing device 310 may prefetch and cache application data based on how often the frequently requested application data are updated at the application data host.

In some embodiments, the requested application data may correspond to a large file such as a movie or a software application, and the transmission of the entire file may take an extended period of time to complete (e.g., transmission of a high-definition movie may take close to an hour or more to complete). In such a scenario, in order for routing device 310 to generate a data digest over the entire file, routing device 310 may have to wait until the entire file is received from the application data host. However, during this time, routing device 310 may receive addition requests for the same file, and waiting for the entire file to generate the data digest may delay the decision to cache the application data. Hence, in some embodiments, the data digest that routing device 310 uses to determine whether to cache the application data may be generated over a portion of requested application data such that, for example, the determination to cache the application data can be made faster.

In some embodiments, to track the application data requests received by routing device 310, routing device 310 may use an application data request log such as application data request log 400 shown in FIG. 4. Application data request log 400 can be stored, for example, in the run-time memory of routing device 310. Application data request log 400 can be used to track or monitor information about each application data request that the routing device receives. For example, the information being tracked or monitored may include, for each received request: a network resource identifier 402 associated with the request, a requester ID 404 of the client device that sent the request, a timestamp 406 of the request, and a data digest 408 (if applicable) generated from received application data corresponding to the request/ network resource identifier. It should be understood that in some embodiments, application data request log 400 can track fewer or more information about each request, and that the information about each request can be represented in other forms not specifically shown. Furthermore, although application data request log 400 is shown in FIG. 4 as a table, other data structures can be used.

Network resource identifier 402 identifies the particular application data being requested by a request. In some embodiments, network resource identifier 402 can be represented as a URI or URL as shown, and/or can be represented as an IP address such as the destination IP address of the request. Requester ID 404 identifies the source of the request (i.e. the client device that sent the request). Requestor ID 404 can be represented as a device name of the client device, an IP address of the client device, a hardware identifier of the client device (e.g., a MAC address), or other suitable device identification information that can uniquely identify the client device to routing device 310.

Timestamp 406 indicates the time that the application data request is received by routing device 310. As described above, in some embodiments, the criteria for determining whether to cache application data corresponding to a request may require receiving at least a threshold number of previous matching network resource identifies 402 and associated data digests 408. In some embodiments the criteria for determining whether to cache the application data may additionally require that the threshold number of matching network resource identifiers, or matching network resource identifiers associated with matching data digests 408 be received within a predetermined time period such as a predetermined time window. For example, the criteria for routing device 310 to cache the application data corresponding to a request may include receiving a threshold number of matching network resource identifiers 402 within the last 10 minutes, last 15 minutes, last 30 minutes, last hour, or last day, etc. It should be understood that in some embodiments, other predetermined time periods or predetermined time window durations can be used. Timestamp 406 can be used by the routing device to determine if the requisite number of matching network resource identifiers 402 are received within the predetermined time period. As explained below, in some embodiments, timestamp 406 can also be used to determine how much additional time is added to a time-to-live of cached application data when a newly request for cached application data is received.

Data digest 408 can be a value that is derived from or computed over at least a portion of the application data received from an application data host corresponding to a request. Data digest 408 can be used by routing device 310 to determine if the received application data is identical to previously received application data for the same network resource identifier. For example, in some embodiments, data digest 408 can be a hash, a checksum, a parity value, a modular sum, or other value representing a fingerprint of the received application data. In some embodiments, if the application data received by routing device 310 is in an encrypted form, routing device 310 may decrypt the encrypted application data before deriving the data digest such that the data digest is generated from unencrypted data. In some embodiments, a mismatch between a data digest derived from one application data and a data digest derived from another application data when their associated network resource identifiers are the same may indicate that the application data host has updated the application data in between the requests. In such scenarios, routing device 310 may determine not to cache the application data when the data digest derived from the received application data does not match one or more of the previous data digests associated with previously received matching network resource identifiers.

In some embodiments, routing device 310 may also use an application data cache table such as application data cache table 450 shown in FIG. 4 to track whether the application data corresponding to a network resource identifier is being cached in the application data cache of routing device 310. Application data cache table 450 can be stored, for example, in the run-time memory of routing device 310. Application data cache table 450 may include information about the received application data corresponding to each network resource identifier. For example, application data cache table 450 may include information such as network resource identifier 452 to identify the application data, cache indicator 455 indicating whether the application data is currently being cached, a time-to-live 457 (if applicable) indicating the amount of time remaining that the application data will be cached at the routing device 310, and a memory location 453 (if applicable) indicating the memory address in the application data cache where the application data is stored. It should be understood that in some embodiments, application data cache table 450 can include fewer or more information about the application data, and that the information included in application data cache table 450 can be represented in other forms not specifically shown. Furthermore, although application data cache table 450 is shown in FIG. 4 as a table, other data structures can be used.

Network resource identifier 452 in application data cache table 450 can be represented as a URI or URL as shown, and/or can be represented as an IP address. Cache indicator 455 can be used to indicating whether the application data corresponding to network resource identifier 452 is currently being cached in the application data cache of routing device 310. In some embodiments, cache indicator 455 can be set to an affirmative value when routing device 310 makes a determination to cache the application data and caches the application data. In some embodiments, cache indicator 410 can be set to a null value when routing device makes a determination not to cache the application data, or when the cached application data is de-cached, for example, when a time-to-live for the cached application data expires, or if a client device requests the same application data again while the application data is cached. When a new request is received, routing device 310 may compare the network resource identifier of the request to network resource identifiers 452 in application data cache table 450 and check cache indicator 455 to determine if the requested application data is currently cached at routing device 310. If cache indicator 455 indicates that the application data is available in the application data cache of routing device 310, routing device 310 can send the requested application data to the client device without requesting the application data again from the application data host. If cache indicator 455 indicates that the application data is not being cached or if the network resource identifier of the request does not match any network resource identifier 452 in application data cache table 450, routing device 310 can forward the request to the application data host.

Time-to-live 457 indicates the amount of time that the application data corresponding to network resource identifier 452 is cached in the application data cache of routing device 310. Application data that is not being cached may not have a time-to-live 457 associated with it. In some embodiments, when routing device 310 determines to cache the application data corresponding to network resource identifier 452, routing device 310 may determine a time-to-live for the application data. For example, routing device 310 may assign a default time-to-live amount of time to the application data (e.g., 30 minutes, 1 hour, 1 day, 1 week, etc.). In some embodiments, the time-to-live can be based on the number of previously received network resource identifiers corresponding to the application data such that popular application data are cached longer than less popular application data. In some embodiments, the time-to-live can additionally or alternatively be dependent on one or more factors such as the source or host of the application data being cached, the type of application data being cached, the size of the application data being cached, etc. In some embodiments, when a new request is received to request application data that is already being cached at routing device 310, the time-to-live 457 for the application data can be updated to prolong the amount of time that the application data remains cached. In some embodiments, the amount of time added to the time-to-live 457 in response to receiving a new request for the same application data can be based on the amount of time that has elapsed since the last request for the same application data was received. For example, in some embodiments, a longer amount of elapsed time between the newly received request and the last previous request may result in a shorter amount of time added to the time-to-live 457 of the cached application data, because a longer amount of time between the requests may indicate that the demand for the application data is dwindling. When a time-to-live of the application data expires, the application data can be de-cached from the application data cache of routing device 310.

To provide a better understanding of the operations of routing device 310, FIGS. 4-10 illustrate a series of application data request log 400 and application data cache table 450 at different points in time corresponding in part to the communication flow diagram shown in FIG. 3. In FIGS. 4-10, request number 1, 2, 3, and 4 in application data request log 400 correspond to requests 352, 362, 372, and 382 of FIG. 3, respectively. It should be understood that the sequence of requests shown in the application data request logs and application data cache tables of FIGS. 4-10 are just examples for ease of explanation, and that any number of requests can be received in any order from any number of client devices. Furthermore, although the example requests shown in FIGS. 4-10 are for the same network resource identifier (i.e. same application data) for ease of explanation, it should be understood that routing device 310 may monitor or track requests with different network resource identifiers.

FIG. 4 illustrates application data request log 400 and application data cache table 450 corresponding to a point in time (e.g., at 11:02 am) after routing device 310 has received requests 352 and 362 of FIG. 3, according to some embodiments. In the example shown, the first entry in application data request log 400 corresponds to request 352 from client device 311 received by routing device 310 at 11:02 am. The network resource identifier of request 352 may be a URL having a value of xyz.com to request the web page at the xyz.com website. The data digest derived from application data 356 (e.g., web page content of xyz.com received from the application data host) may be 0x3FA2. The second entry in application data request log 400 corresponds to request 362 from client device 312 received by routing device 310 also at 11:02 am. Request 352 is also a request for a web page at xyz.com, and the data digest derived from application data 366 (e.g., web page content of xyz.com) corresponding to this request may also be 0x3FA2 to indicate the application data received for both requests 352 and 354 are the same.

In the example shown, the criteria for caching application data in routing device 310 may require a network resource identifier and its associated data digest to match at least two previous network resource identifier and associated data digest pairs within the last 15 minutes. At this point in time, since only two requests for xyz.com have been received, routing device 310 determines not to cache the received application data corresponding to the network resource identifier xyz.com. As such, the cache indicator 455 for the network resource identifier of xyz.com in application data cache table 450 may have a null value to indicate that the application data is not being cached at routing device 310.

Next, FIG. 5 illustrates application data request log 400 and application data cache table 450 corresponding to a point in time (e.g., at 11:03 am) when routing device 310 receives request 372 of FIG. 3 from client device 314, according to some embodiments. This third request, request 372 received at 11:03 am, also has a URL of xyz.com to request the web page at xyz.com. The data digest derived from application data 376 corresponding to request 372 is also 0x3FA2 to indicate that the received application data is the same as the previous two requests 352 and 362. Since the network resource identifier and associate data digest of request 372 matches two previous network resource identifiers and associate data digest pairs in application data request log 400, and these requests were received within the last 15 minutes, routing device 310 may determine to cache application data 376. As such, routing device 310 stores application data 376 in its application data cache, and sets the cache indicator corresponding to the network resource identifier of xyz.com in application data cache table 450 to an affirmative value to indicate that the application data corresponding to xyz.com is cached at routing device 310. In the example shown, routing device 310 may set a default time-to-live 457 of 30 minutes for this application data, and the application data corresponding to xyz.com may be cached at memory address 0x2800 in the application data cache.

FIG. 6 illustrates application data request log 400 and application data cache table 450 corresponding to a later point in time (e.g., at 11:08 am), according to some embodiments. At 11:08 am, routing device 310 has not received any additional requests, and thus application data request log 400 has not changed. Since 5 minutes have passed since the application data corresponding to xyz.com was first cached at 11:03 am, the time-to-live for the application data corresponding to xyz.com in application data cache table 450 has been shortened from 30 minutes down to 25 minutes.

FIG. 7 illustrates application data request log 400 and application data cache table 450 corresponding to a point in time (e.g., at 11:10 am) when routing device 310 receives request 382 of FIG. 3 from client device 315, according to some embodiments. This fourth request, request 382 received at 11:10 am, may have a URL of xyz.com as its network resource identifier to request the web page at xyz.com. Routing device 310 may compare the network resource identifier against the entries in application data cache table 450, and check the cache indicator for xyz.com to determine if the application data corresponding to xzy.com is currently cached at routing device 310. Since the cache indicator for xyz.com in application data cache table 450 indicates that the application data is available from the application data cache of routing device 310, instead of forwarding the request to the application data host, routing device 310 retrieves the application data from memory address of 0x2800 of the application data cache as indicated in application data cache table 450, and sends the application data from the application data cache to client device 315. As routing device 310 did not request the application data from the application data host for request 382, derivation of the data digest can be omitted.

In some embodiments, routing device 310 may add additional time to the time-to-live of the cached application data when a new request is received for the cached application data. The amount of time added to the time-to-live may depend on the amount of time that has elapsed since the last request for the cached application was received. For example, if a new request is received within a first time period (e.g., 10 minutes) of the previous request for the same application data, routing device 310 may set the time-to-live for the cached application data back to the default amount of time (e.g., 30 minutes); and if the new request is received within a second time period (e.g., between 10 to 30 minutes) of the previous request for the same application data, routing device 310 may add 5 minutes to the time-to-live of the cached application data, etc. Thus, in the example shown in FIG. 7, because the elapsed time between request 382 from client device 315 and the previous request 372 from client device 314 is 7 minutes, which is less than 10 minutes, the time-to-live for the application data correspond to xyz.com is reset to the default 30 minutes to extend the amount of time that the application data is cached at routing device 310. In should be understood that in some embodiments, other amounts of time for other ranges of elapsed time since the previous request can be added to the time-to-live of the cached application data. In some embodiments, the amount of time added to the time-to-live can be dependent not only on when the last request was received, but can additionally or alternatively depend on the number or previous requests received within a predetermined time period.

FIG. 8 illustrates application data request log 400 and application data cache table 450 corresponding to a later point in time (e.g., at 11:20 am), according to some embodiments. At 11:20 am, routing device 310 has not received any additional requests since 11:10 am, and thus application data request log 400 has not changed. Since 10 minutes have passed since the time-to-live for application data corresponding to xyz.com was set to 30 minutes, the time-to-live for the application data corresponding to xyz.com in application data cache table 450 has been shortened from 30 minutes down to 20 minutes.

FIG. 9 illustrates application data request log 400 and application data cache table 450 corresponding to a point in time (e.g., at 11:32 am) when routing device 310 receives a fifth request (not shown in FIG. 3) from another client device (e.g., client device 316), according to some embodiments. This fifth request may have a URL of xyz.com as its network resource identifier to request the web page at xyz.com. Routing device 310 may compare the network resource identifier against the entries in application data cache table 450, and check the cache indicator for xyz.com to determine if the application data corresponding to xzy.com is currently cached at routing device 310. Since the cache indicator for xyz.com in application data cache table 450 indicates that the application data is still available from the application data cache of routing device 310, instead of forwarding the request to the application data host, routing device 310 retrieves the application data from memory address of 0x2800 of the application data cache as indicated in application data cache table 450, and sends the application data from the application data cache to client device 316. As routing device 310 did not request the application data from the application data host for request 382, derivation of the data digest can be omitted.

In some embodiments, continuing with the example of adding additional time to the time-to-live, because the elapsed time between this fifth request from client device 316 and the previous request 382 from client device 315 is 22 minutes, which is between 10 and 30 minutes, routing device 310 may add 5 minutes to the time-to-live to the application data corresponding to the network resource identifier of xyz.com. At the time this fifth request was received the time-to-live of the application data corresponding to zxy.com would have been 8 minutes. Thus, as shown in FIG. 9, the time-to-live for the cached application data corresponding to xyz.com is updated to 13 minutes.

FIG. 10 illustrates application data request log 400 and application data cache table 450 corresponding to a point in time (e.g., at 11:36 am) when routing device 310 receives a sixth request (not shown in FIG. 3) from client device 311, according to some embodiments. This sixth request may have a URL of xyz.com as its network resource identifier to request the web page at xyz.com. Routing device 310 may compare the network resource identifier against the entries in application data cache table 450, and check the cache indicator for xyz.com to determine if the application data corresponding to xzy.com is currently cached at routing device 310. The cache indicator for xyz.com in application data cache table 450 indicates that the application data is still available from the application data cache of routing device 310.

In some embodiments, routing device 310 may also check application data request log 400 to determine if client device 311 has previously requested the same application data. Since client device 311 has previously requested (e.g., at 11:02 am) the same application data, this may indicate that client device 311 is requesting the application data to be re-downloaded from the application data host. This may occur, for example, when a user of client device 311 refreshes the web browser application on client device 311. This may also indicate that the application data at application data host may have been updated. Thus, in this scenario, even though the requested application data is available from the application data cache of routing device 310, routing device 310 still forwards the request to the application data host to request the latest application data available. In the example shown in FIG. 10, the web page at xyz.com has been updated by the application data host, and thus the data digest derived from the received application data corresponding to this sixth request (e.g., 0x4F55) is different than the previously derived data digests (e.g., 0x3FA2). In some embodiments, because the cached version of the application data is no longer up to date, routing device 310 may de-cache the application data corresponding to the network resource identifier of xyz.com, and sets the cache indicator for xyz.com to have a null value as shown in FIG. 10, even though the time-to-live for the cached application data correspond to xyz.com has not yet expired. Routing device 310 may then wait for additional requests with matching network resource identifiers and associated data digests to satisfy the caching criteria before routing device 310 caches the newly received application data.

In some embodiments, routing device 310 may replace the cached application data for xyz.com in the application data cache with the newly received application data without requiring the caching criteria to be satisfied again. In such embodiments, the cache indicator for the application data corresponding to xyz.com in application data cache table 450 may retain an affirmative value, and the time-to-live for the application data can be reset to the default time-to-live, or be updated according to the principles described above.

As indicated above, according to some embodiments, a request for application data received by a routing device may correspond to a HTTPS request or other types of request for application data to be received on a secure channel (e.g., Secure Sockets Layer (SSL) channel, Transport Layer Security (TLS) channel, etc.). In such scenarios, a separate secure channel for each request from each client device is used to transmit the application data, and each secure channel may encrypt the application data using a session key that is unique to that particular secure channel. Because the application data received by the routing device is encrypted, and each secure channel may use a different session key, the routing device may not be able to identify whether the received application data for the different requests are the same, because the data digests derived from the encrypted application data would be different for each request even when the underlying data is the same. Accordingly, in some embodiments, if the request from a client device is for application data to be received on a secure channel, the routing device may perform additional processing as described below to decrypt the application data that the routing device receives to enable the routing device to properly analyze the application data.

Figure 11:
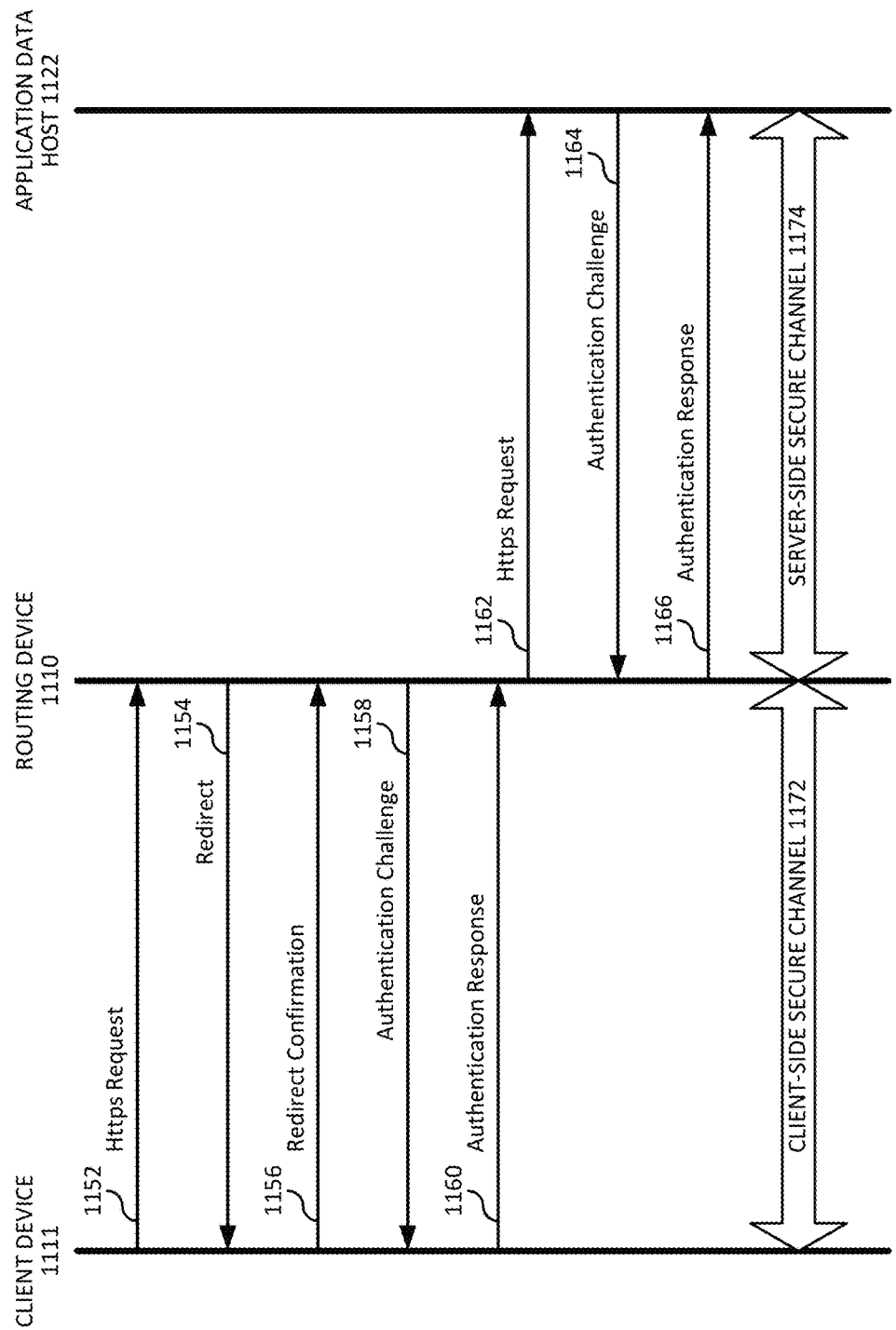
FIG. 11 illustrates a communication flow diagram involving a routing device, according to some embodiments.

FIG. 11 illustrates a communication flow diagram between a routing device 1110, a client device 1111, and an application data host 1122, according to some embodiments. Routing device 1110 can be, for example, routing device 110, 210, or 310 described above. Client device 1111 can be a computing device such as any of computing devices 111, 112, 114, or 115 shown in FIG. 1, or other internet ready computing device. Application data host 1122 can be application data host 122 shown in FIG. 1, application data host 322 shown in FIG. 3, or other suitable computing device that can host network accessible application data (e.g., web server, cloud server, etc.). Client device 1111 can be part of a local area network that is connected via routing device 1110 to an external network (e.g., the internet, cloud network, etc.) where application data host 1122 resides.

Client device 1111 may send a request 1152 for application data hosted by application data host 1122 to routing device 1110. The application data can be, for example, web content (e.g., a web page, etc.), file content (e.g. document, image, software, etc.), media content (e.g., song, audio clip, image, photo, video clip, movie, etc.), or other network accessible data usable by client device 1111. In some embodiments, request 1152 may include a network resource identifier or information derived from a network resource identifier to identify the application data host hosting the application data. The network resource identifier can be, for example, a uniform resource identifier (e.g., a uniform resource locator such as a web address), an IP address, or other information that routing device 1110 can use to direct request 1152 to application data host 1122. Request 1152 can be sent by client device 1111, for example, in response to client device 1111 receiving user input of a network resource identifier on a software application running on client device 1111 such as an internet browser, media player, file system manager, or other applications that can be used to access a network. In some embodiments, the request may be sent by computing device 1111 according to a programmed schedule. In some embodiments, request 1152 for application data may correspond to a request to establish a secure channel between client device 1111 and application data host 1122 such that the requested application data and/or communications between client device 1111 and application data host 1122 can be exchanged securely in an encrypted form. For example, request 1152 may include a Hypertext Transfer Protocol Secure (HTTPS) request as shown, or other types of request to establish a secure channel (e.g., Secure Sockets Layer (SSL) channel, Transport Layer Security (TLS) channel, etc.) through routing device 1110 that terminates on one end at client device 1111 and terminates on the other end at application data host 1122.

To establish a secure channel that terminates on one end at client device 1111 and on the other end at application data host 1122, client device 1111 and application data host 1122 may exchange a series of protocol handshake messages (e.g., SSL) via routing device 1110, where routing device 1110 acts as a conduit to forward the protocol handshake messages being exchanged. The protocol handshake messages can be used to authenticate client device 1111 and application data host 1122, for example by exchanging and/or verifying their respective digital certificates (e.g., that the certificate was issued by a trusted certificate authority). The protocol handshake messages are also used to exchange cipher settings of the devices to establish the encryption keys and algorithm (e.g., a cipher suite) to use in the secure session being established between client device 1111 and application data host 1122. Once the client device 1111 and application data host 1122 are authenticated and the encryption keys (may also be referred to herein as "session key" or "session keys") to use in the secure session have been derived, a secure channel between two devices is established. Application data host 1122 can then encrypt the requested application data, and securely transmit the application data in an encrypted form to client device 1111 via routing device 1110.

However, in such a scenario, because the secure channel terminates on one end at client device 1111 and on the other end at application data host 1122, only these two devices may have the proper session keys to decrypt the data and communications being exchanged on the secure channel. Even though routing device 1110 receives the requested application data from application data host 1122 and forwards the application data onto client device 1111, the application data is received by routing device 1110 in an encrypted form, and routing device 1110 may not be able to decrypt the application data. As such, routing device 1110 may not be able to properly analyze the application data to determine if the application data should be cached. Hence, in some embodiments, when routing device 1110 receives request 1152 to request the application data and to establish a secure channel between client device 1111 and application data host 1122, instead of establishing the secure channel between client device 1111 and application data host 1122, routing device 1110 may establish two separate secure channels that terminate at routing device 1110—a client-side secure channel that terminates at client device 1111 and routing device 1110, and a host-side secure channel that terminates at routing device 1110 and application data host 1122.

In some embodiments, because routing device 1110 may no longer forward the original request 1152 from client device 1111 onwards to application data host 1122 to set up the originally requested secure channel between client device 1111 and application data host 1122, routing device 1110 may respond to request 1152 with a redirect response 1154. Redirect response 1154 can be used to indicate to client device 1111 that request 1152 is being redirected from being forwarded to application data host 1122 to being processed by routing device 1110. In some embodiments, client device 1111 may display a redirect notification to the user, and the redirect notification may ask the user of client device 1111 for permission to allow routing device 1110 to redirect request 1152. If the user grants permission to routing device 1110 to redirect request 1152, client device 1111 may send a redirect confirmation 1156 to routing device 1110, and routing device 1110 may then establish the client-side secure channel between client device 1111 and routing device 1110 after receiving the confirmation to establish the client-side secure channel. If the user does not grant permission to routing device 1110 to redirect request 1152, routing device may forward request 1152 to application data host 1122 to establish a secure channel between client device 1111 and application data host 1122 as described above. In some embodiments, the redirect response 1154 and/or redirect confirmation 1156 can be omitted. For example, routing device 1110 may include a configuration setting that can be set by a user to automatically perform the redirect without requiring explicit permission from the user each time a request for application data to be received on a secure channel is made.

To establish the client-side secure channel, routing device 1110 and client device 1111 may exchange and/or verify their respective digital certificates. Routing device 1110 and client device 1111 may exchange their cipher settings to establish the encryption keys and algorithm (e.g., a cipher suite) to use in the client-side secure session being established between client device 1111 and application data host 1122. In some embodiments, routing device 1108 may send an authentication challenge 1158 to client device 1111. For example, authentication challenge 1158 may request client device 1111 to sign or encrypt a piece of information (e.g., a random number). Client device 1111 may send an authentication response 1160 (e.g., a signed or encrypted piece of information) to routing device 1110 for verification. In some embodiments, the information provided in the authentication process can be used to derive the session keys for the client-side secure channel. In some embodiments, client device 1111 may alternatively or additionally send an authentication challenge to routing device 1110. Once client device 1111 and routing device 1110 have authenticated each other and the session keys have been derived, client-side secure channel 1172 is established between client device 1111 and routing device 1110. In some embodiments, client-side secure channel 1172 between client device 1111 and routing device 1110 can be established using the same protocol handshake (e.g., SSL) that would have been used for establishing the originally requested secure channel between client device 1111 and application data host 1122.

To establish the host-side secure channel between routing device 1110 and application data host 1122, routing device 1110 may send a request 1162 to request the same application data requested by request 1152 over a secure channel from application data host 1122. Routing device 1110 and application data host 1122 may exchange and/or verify their respective digital certificates. Routing device 1110 and application data host 1122 may exchange their cipher settings to establish the encryption keys and algorithm (e.g., a cipher suite) to use in the host-side secure session being established between routing device 1110 and application data host 1122. In some embodiments, application data host 1122 may send an authentication challenge 1114 to routing device 1110. For example, authentication challenge 1164 may request routing device 1110 to sign or encrypt a piece of information (e.g., a random number). Routing device 1110 may send an authentication response 1166 (e.g., a signed or encrypted piece of information) to application data host 1122 for verification. In some embodiments, the information provided in the authentication process can be used to derive the session keys for the host-side secure channel. In some embodiments, routing device 1110 may alternatively or additionally send an authentication challenge to application data host 1122. Once routing device 1110 and application data host 1122 have authenticated each other and the session keys have been derived, host-side secure channel 1174 is established between routing device 1110 and application data host 1122. In some embodiments, host-side secure channel 1174 between routing device 1110 and application data host 1122 can be established using the same protocol handshake (e.g., SSL) that would have been used for establishing the originally requested secure channel between client device 1111 and application data host 1122.

After client-side secure channel 1172 and host-side secure channel 1174 have been established, application data host 1122 may encrypt the application data originally requested by client device 1111 using the host-side secure channel session key and send the encrypted application data to routing device 1110 on host-side secure channel 1174. Routing device 1110 then receives the application data in an encrypted form from application data host 1122 on host-side secure channel 1174. Since host-side secure channel 1174 terminates at routing device 1110, routing device 1110 has the requisite host-side secure channel session key to decrypt the encrypted application data. Routing device 1110 then decrypts the encrypted application data, and analyzes the application data to determine whether to cache the application data, for example, using the principles described above. Routing device 1110 can then re-encrypt the application data using the client-side secure channel session key, and transmit the re-encrypted application data to client device 1111 on client-side secure channel 1172.

If the application data is determined not to be cached, routing device 1110 may transmit the application data to client device 1111 without storing the application data in the application data cache of routing device 1110. If the application data is determined to be cached, routing device 1110 may store the received application data in the application data cache of routing device 1110 such that the application data remains stored in the application data cache of routing device 1110 for future transmission after the re-encrypted application data has been transmitted to client device 1111. When routing device 1110 receives a subsequent request for the same application data from a client device, routing device 1110 may transmit the application data stored in the application data cache of routing device 1110 to that client device without requesting the application data from application data host 1122 again.

In some embodiments, the application data can be cached unencrypted. In some embodiments, to prevent unauthorized access to the application data being cached at routing device 1100, routing device 1100 may re-encrypt the application data before storing the application data in the application data cache such that the application data is cached in an encrypted form. In some embodiments, the application data can be re-encrypted using a routing device encryption key that is separate and different than the secure channel session keys. When a subsequent request is received from a client device for the cached application data, routing device 1100 may decrypt the cached application data using the routing device encryption key, and re-encrypt the application data using the session key of secure channel, and transmit the re-encrypted application data on the secure channel. In some embodiments, when routing device 1110 determines that the application data is no longer to be cached (e.g., when a time-to-live expires as described above), routing device 1110 may de-cache the application data from the application data cache of routing device 1110. De-caching the application data may include, for example, one or more of allowing the memory location of the application data cache storing the application data to be overwritten, removing the application data from the application data cache, setting the cache indicator corresponding to the application data to a null value, etc.

Accordingly, a routing device that can perform contextual application data caching has been described. In some embodiments, the routing device can perform contextual application data caching even when the application data is transmitted over secure channels. The contextual application data caching can alleviate the bottleneck that an application data host may experience during high demands for application data. Requests for the application data can also be fulfilled faster by eliminating the network delays required for forwarding the request to the application data host and receiving the application data from the application data host. The techniques described herein can also be used to perform analysis of the underlying application data in the network traffic transiting though a routing device. For example, by decrypting the application data at the routing device, which may otherwise be encrypted via secure sessions, raw application data can be analyzed and examined to determine, for example, trends of application data demand.

Figure 12:
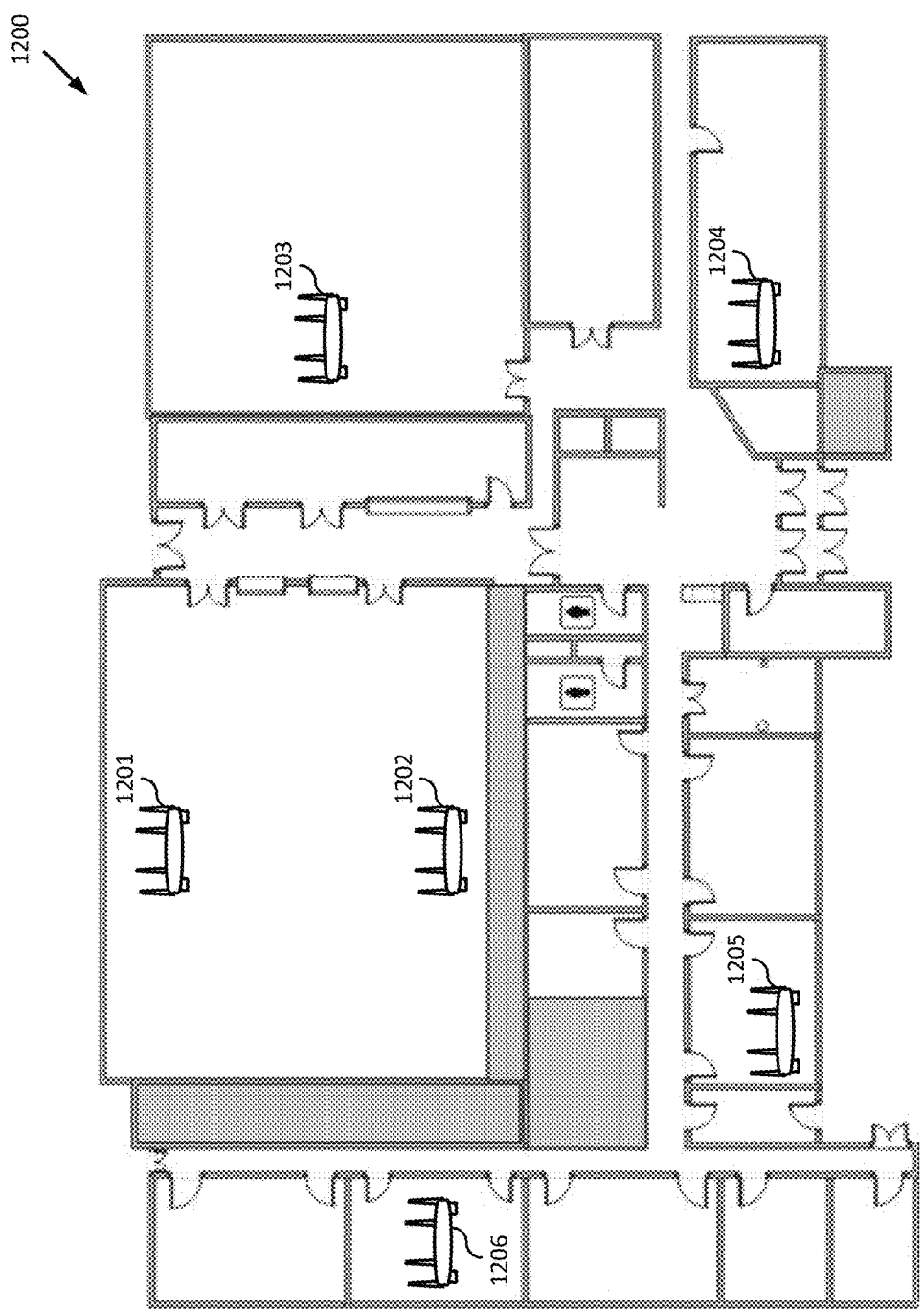
FIG. 12 illustrates an example of a system that includes a cluster of routing devices, according to some embodiments.

In some embodiments, multiple routing devices with contextual application data caching capabilities as described herein can be deployed in a system to leverage and share the capabilities amongst the routing devices in the system. FIG. 12 illustrates an example of a system 1200 that includes a cluster of routing devices, according to some embodiments. System 1200 can be deployed, for example, in an environment such as a residence, a business enterprise, a school, or other institutions or establishments, or any combinations thereof. In some embodiments, system 1200 can be deployed, for example, across multiple floors of a building or across multiple nearby buildings.

System 1200 may include any number of routing devices such as routing device 1201, 1202, 1203, 1204, 1205, and/or 1206. Each routing device can be a router, a gateway, an access point, a repeater, a network bridge, a network switch, a network hub, a modem, a base station, other networking device that can provide network access to one or more computing devices, or any combination thereof. Furthermore, not all routing devices in system 1200 need to be of the same type of routing device. Each routing device may provide network connectivity to any number of computing devices that are connected to the particular routing device and/or are within the range of the particular routing device. Each routing device and its associated computing devices can form a local area network. Routing devices 1201, 1202, 1203, 1204, 1205, and/or 1206 can be communicatively coupled to each other to form a larger local area network such as an intranet, and to extend the coverage area beyond that of any one routing device.

By coupling routing devices 1201, 1202, 1203, 1204, 1205, and/or 1206 together in system 1200, the capacity of the application data cache of each of the routing devices 1201, 1202, 1203, 1204, 1205, and/or 1206 can be combined together to form a shared application data cache such that distributed application data caching for the cluster of routing devices in system 1200 can be performed. Distributed application data caching allows for more efficient use of the application data caches available in system 1200. For example, some of the routing devices may be connected to fewer client devices than others, and may receive less requests for application data than other routing devices that are connected to more client devices. As a result, the application data caches of these less active routing devices may not be fully utilized, whereas the application data caches of other more active routing devices that are connected to more client devices may fill up quickly. By sharing the application data caches across system 1200, unused cache spaces in the less active routing devices can be utilized by other more active routing devices, for example, when application data caches of the more active routing devices become full.

In some embodiments, to facilitate monitoring of the application data requests and analysis of the application data received from application data hosts, the information in the application data request logs and application data cache tables of the routing device in system 1200 are shared amongst the routing devices. For example, each time a request and/or application data is received by a routing device, the routing device may broadcast information about the request and/or application data to the other routing devices in system 1200. In this manner, the application data request log stored at each routing device can include information for all application data requests received across system 1200, and the application data cache table stored at each routing device can include caching information for all routing devices in system 1200. An additional routing device ID field in the application data request log and application data cache table can be used to identify which routing device received the request and which routing device may be caching the application data.

In some embodiments, a computing device acting as a system controller (e.g., can be one of the routing devices acting as a master routing device) can be used to monitor and track the application data requests received across system 1200. For example, each time a request and/or application data is received by a routing device, the routing device may send information about the request and/or application data to the system controller. The system controller may monitor the requests across system 1200, and instruct the routing devices in system 1200 when to cache certain application data (e.g., when a threshold number of matching network resource identifiers and associated data digests have been received in system 1200). The system controller may also keep track of which routing device is caching certain application data, update the time-to-live of the cached application data across system 1200, and instruct the routing devices to de-cache application data when appropriate.

Figure 13:
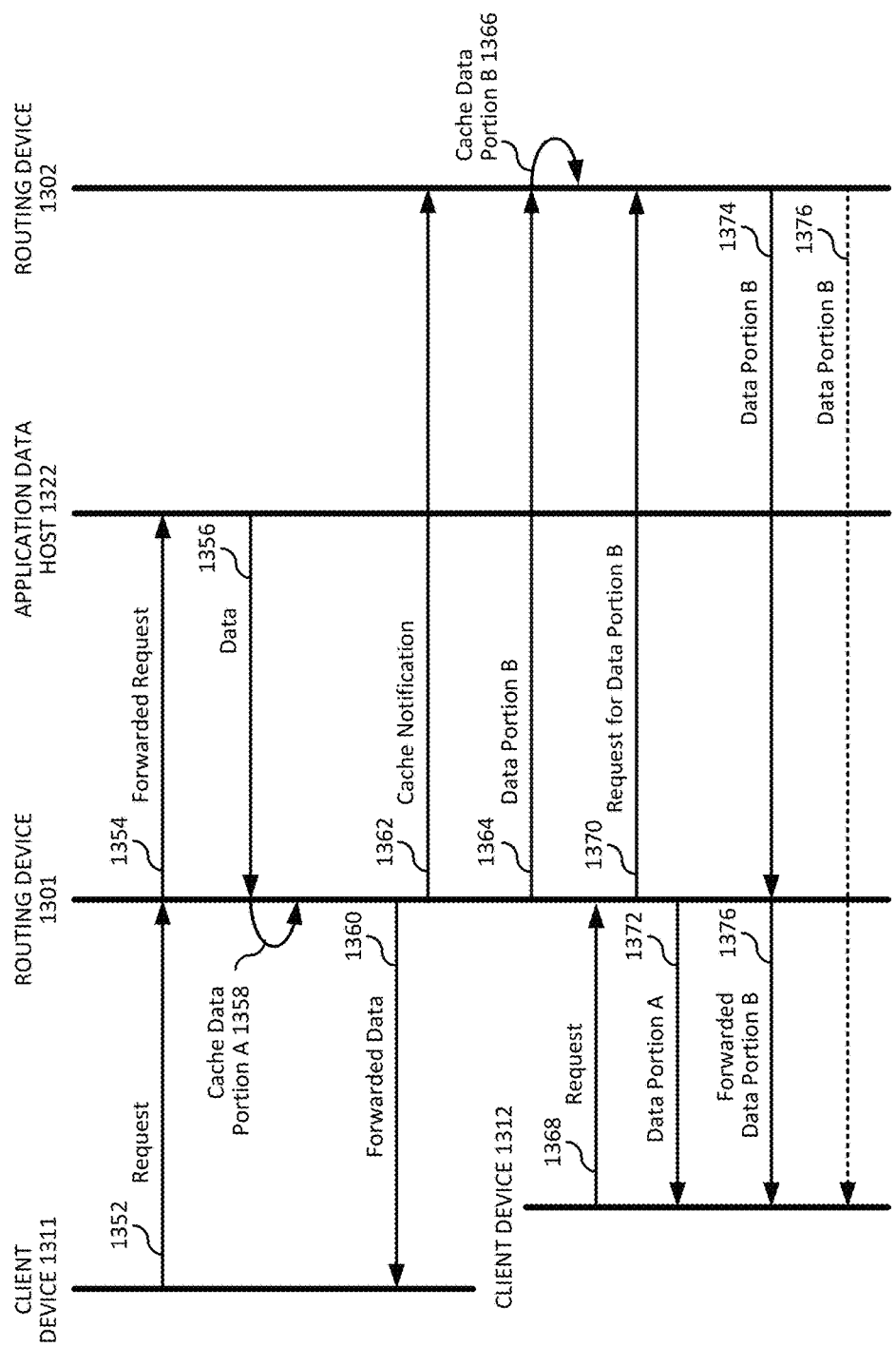
FIG. 13 shows a communication flow diagram illustrating the operation of a system of routing devices, according to some embodiments.

FIG. 13 shows a communication flow diagram illustrating the operation of a system of routing devices, according to some embodiments. Although only two routing devices 1301 and 1302 are shown in FIG. 13, it should be understood that the principles describe herein can be extended to a system of any number of routing devices. In some embodiments, routing device 1301 may be in communication with client devices 1311 and 1312.

According to some embodiments, client device 1311 may send a request 1352 for application data hosted by application data host 1322 to routing device 1301. When routing device 1301 receives request 1352 to request application data from application data host 1322, routing device 1301 may send request 1352 as a forwarded request 1354 towards application data host 1322. In response to receiving forwarded request 1354, application data host 1322 may send the requested application data 1356 to routing device 1301. When routing device 1301 receives the requested application data 1356, routing device 1301 may forward application data 1356 as forwarded application data 1360 to client device 1311.

In some embodiments, routing device 1301 may determine to cache application data 1356, for example, if the network resource identifier and associated data digest of application data 1356 matches a threshold number or previous network resource identifiers and associated data digests. It should be noted the previous network resource identifiers and associated data digests need not correspond to requests received by just routing device 1301, but instead can correspond to requests received by any number of routing devices in the system.

In some embodiments, routing device 1301 may not have sufficient free space in the application data cache of routing device to cache all of application data 1356. As a result, routing device 1301 may cache a first portion of the application data locally in the application data cache of routing device 1301. Routing device 1301 may determine that there is sufficient space in routing device 1302 to cache a second portion of the application data (e.g., by examining the shared application data cache table of the system), and may send a cache notification 1362 to routing device 1302 to notify routing device 1302 to cache the second portion of the application data in the application data cache of routing device 1302. Routing device 1301 may then send the second portion of the application data 1364 that routing device 1301 did not cache locally to routing device 1302. Thus, in some embodiments, instead of receiving the application data for caching from an application data host, the application data being cached at routing device 1302 can be provided to routing device 1302 from another routing device (e.g., routing device 1301) in the system. In some embodiments, cache notification 1362 and the second portion of the application data 1364 can be sent to routing device 1302 as part of the same transmission.

In some embodiments, the size (i.e. the data storage size) of the first portion of the application data being locally cached in the application data cache of routing device 1301 can be determined based on the amount of available cache space in the application data cache of routing device 1301. For example, the size of the first portion of application data being locally cached at routing device 1301 can based on the total amount of the currently unused cache space at routing device 1301. In such an example, the application data cache of routing device 1301 may become full once the first portion of the application data is stored in the application data cache of routing device 1301. In some embodiments, to reserve some cache space for future application data requests, the size of the first portion of application data being locally cached at routing device 1301 can based on a percentage (e.g., 10%, 20%, 30%, etc.) of the currently unused cache space at routing device 1301. In this manner, the data storage size of the first portion of the application data being cached at routing device 1301 can be less than the amount of available cache space in the application data cache of routing device 1301 such that there will be some remaining unused cache space at routing device 1301 reserved for future application data.

At 1366, routing device 1302 may cache the second portion of the application data. In some embodiments, prior to being notified to cache the second portion of the application data, routing device 1302 may not have received any prior request for the application data. Hence, in some embodiments, a routing device can be used to cache application data without receiving a prior request for that application data. It should be understood that in some embodiments, routing device 1301 may cache none of the application data, and all of the application data may be cached at routing device 1302. It should also be understood that in some embodiments, the application data can be distributed and cached in more than just the two routing devices shown. For example, the application data can be divided into three portions that are cached in three separate routing devices of the system. In some embodiments, the application data being requested may correspond to multiple files, and the application data can be divided up according to the different files such that the portion of the application data being cached at each routing device may correspond to one or more files.

In some embodiments, routing device 1301 may receive a subsequent request 1368 from client device 1312 for the same application data. Routing device 1301 may determine that the application data being requested is currently being cached in the system, and may examine the shared application data cache table to determine that the a first portion of the application data is cached at routing device 1301 and a second portion of the application data is cached at routing device 1302. Since the first portion of the application data is cached at routing device 1301, routing device 1301 may send the first portion of the application data 1372 from the local application data cache of routing device 1301 to client device 1312. Since the second portion of the application data is cached at routing device 1302, routing device 1301 may send a request 1370 to routing device 1302 to request the second portion of the application data that is being cached at routing device 1302. In some embodiments, routing device 1301 may request routing device 1302 to provide the second portion of the application data being cached at routing device 1302 to routing device 1301 for transmission to client device 1032 (e.g., such that routing device 1301 may forward the second portion of the application data to client device 1312). In response, routing device 1302 may send the second portion of the application data 1374 to routing device 1301, and routing device 1301 may forward the second portion of the application data 1374 as forwarded application data 1376 to client device 1312. In some embodiments, routing device 1301 may request routing device 1302 to provide the second portion of the application data being cached at routing device 1302 directly to client device 1312. If so, routing device 1302 may send the second portion of the application data 1376 directly to client device 1312.

In the example described above, the second portion of the application data may be cached at routing device 1302 after the application data cache of routing device 1301 is full. In some embodiments, routing device 1302 can be used to cache at least a portion of the application data if the application data cache of routing device 1302 has more free space that routing device 1301, even though the application data cache of routing device 1301 may not be full. Furthermore, in some embodiments, the routing devices in the system may be requested to cache application data for the system based on an ordering scheme, such as a round robin order, a most-free-space-first order, pseudo-random order, or other sequencing or scheduling mechanism, etc.

Figure 14:
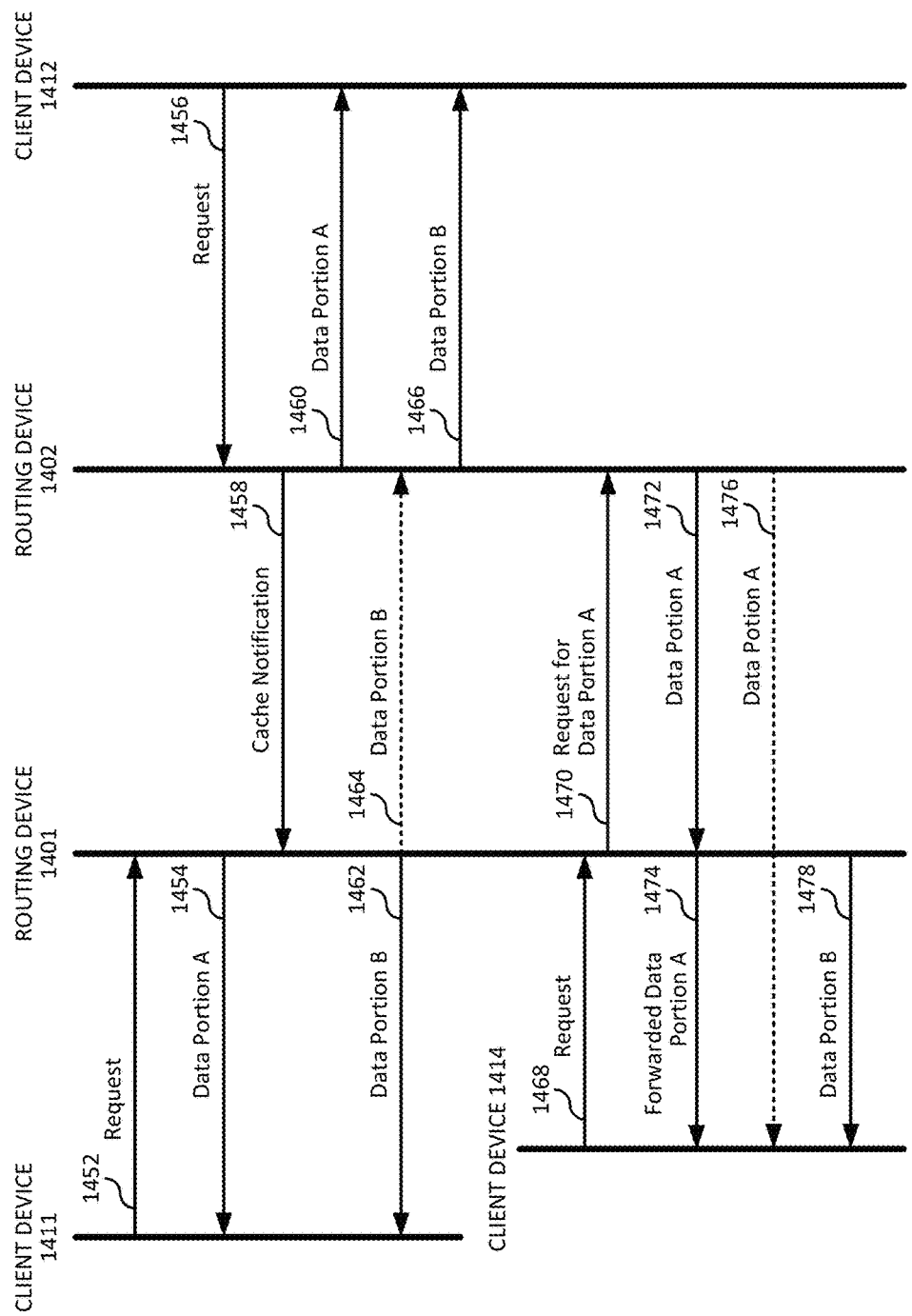
FIG. 14 shows another communication flow diagram illustrating the operation of a system of routing devices, according to some embodiments.

FIG. 14 shows another communication flow diagram illustrating the operation of a system of routing devices, according to some embodiments. Although only two routing devices 1401 and 1402 are shown in FIG. 14, it should be understood that the principles describe herein can be extended to a system of any number of routing devices. For ease of explanation, the interactions between routing devices 1401 and 1402 with the application data host are not shown. In some embodiments, routing device 1401 may be in communication with client devices 1411 and 1414, and routing device 1402 may be in communication with client device 1412.

In some embodiments, client device 1411 may send a request 1452 for application data hosted by an application data host to routing device 1401. When routing device 1401 receives request 1452, routing device 1401 may forward request 1452 to an application data host and receives the requested application data from the application data host. Routing device 1401 may begin sending the application data to client device 1411.

In some embodiments, routing device 1402 may receive a request 1456 for the same application data from client device 1412 while routing device 1401 is in the process of transmitting the application data to client device 1411 in response to prior request 1452. Routing device 1402 may determine to cache the application data based on request 1456, and send a cache notification to routing device 1401 to notify routing device 1401 to cache the application data. At the time that routing device 1402 determines to cache the application data and sends cache notification 1458 to routing device 1401, routing device 1401 may have already transmitted a first portion of the application data 1454 to client device 1411, where a second portion of the application data has not yet been transmitted to client device 1411. In other words, the determination to cache the application data may occur concurrently while routing device 1401 is in the process of transmitting the application data to client device 1411. The second portion of the application data may have yet to be received from the application data host, or may be temporarily stored in the buffer of routing device 1401 waiting for transmission, or a combination thereof. Hence, at the time that routing device 1401 receives cache notification 1458, routing device 1301 may still have a chance to cache the second portion of the application data locally. If so, routing device 1401 may cache the second portion of the application data in the application data cache of routing device 1401, and transmits the second portion of the application data 1462 to client device 1411.

Meanwhile, routing device 1402 may have received the first portion of the application data from the application data host. Routing device 1402 caches the first portion of the application data (e.g., a portion that may correspond to a transmitted portion of the application data that the routing device 1401 has already transmitted to client device 1411) in the application data cache of routing device 1402 and transmits the first portion of the application data 1460 to client device 1412. In some embodiments, because the second portion of the application data is being cached at routing device 1401, routing device 1401 may send the second portion of the application data 1464 to routing device 1402 for transmission to client device 1412. In some embodiments, routing device 1402 may instead receive the second portion of the application data from the application data host. Routing device 1402 then sends the second portion of the application data 1466 to client device 1412.

In some embodiments, routing device 1401 may receive a subsequent request 1468 from client device 1414 for the same application data. Routing device 1401 may determine that the application data being requested is currently cached in the system, and may examine the shared application data cache table to determine that the a first portion of the application data is cached at routing device 1402 and a second portion of the application data is cached at routing device 1401. Since the first portion of the application data is cached at routing device 1402, routing device 1401 may send a request 1470 to routing device 1402 to request the first portion of the application data that is being cached at routing device 1402. In some embodiments, routing device 1401 may request routing device 1402 to provide the first portion of the application data being cached at routing device 1402 to routing device 1401 for transmission to client device 1414 (e.g., such that routing device 1401 may forward the first portion of the application data to client device 1414). In response, routing device 1402 may send the first portion of the application data 1472 to routing device 1401, and routing device 1401 may forward the first portion of the application data 1474 to client device 1414. In some embodiments, routing device 1401 may request routing device 1402 to provide the first portion of the application data being cached at routing device 1402 directly to client device 1414. If so, routing device 1402 may send the first portion of the application data 1476 directly to client device 1412 bypassing routing device 1401.

Since the second portion of the application data is cached at routing device 1401, routing device 1401 may send the second portion of the application data 1478 from the local application data cache of routing device 1401 to client device 1414. When routing device 1402 (or any other routing device in the system) determines that the application data is no longer to be cached by the system, routing device 1402 (or any other routing device in the system) may notify routing device 1401 (and/or routing device 1402) to de-cache the portion of the application data cached at routing device 1401 (and/or routing device 1402).

It should be understood that the terms "first portion," "second portion," etc. as used herein are used to refer to segments of application data, and that the terms may or may not imply the sequence of the application data. In other words, it is not necessary that the first portion is received before the second portion, or vice versa. Furthermore, it is not necessary that the first portion and the second portion constitute the entirely of the received application data, as other portions of the received application data may be cached elsewhere or may not be cached. It should also be understood that the application data may correspond to more than one file, and that each portion may be include one or more files of the application data, or one or more segments of the one or more files of the application data.

Figure 15:
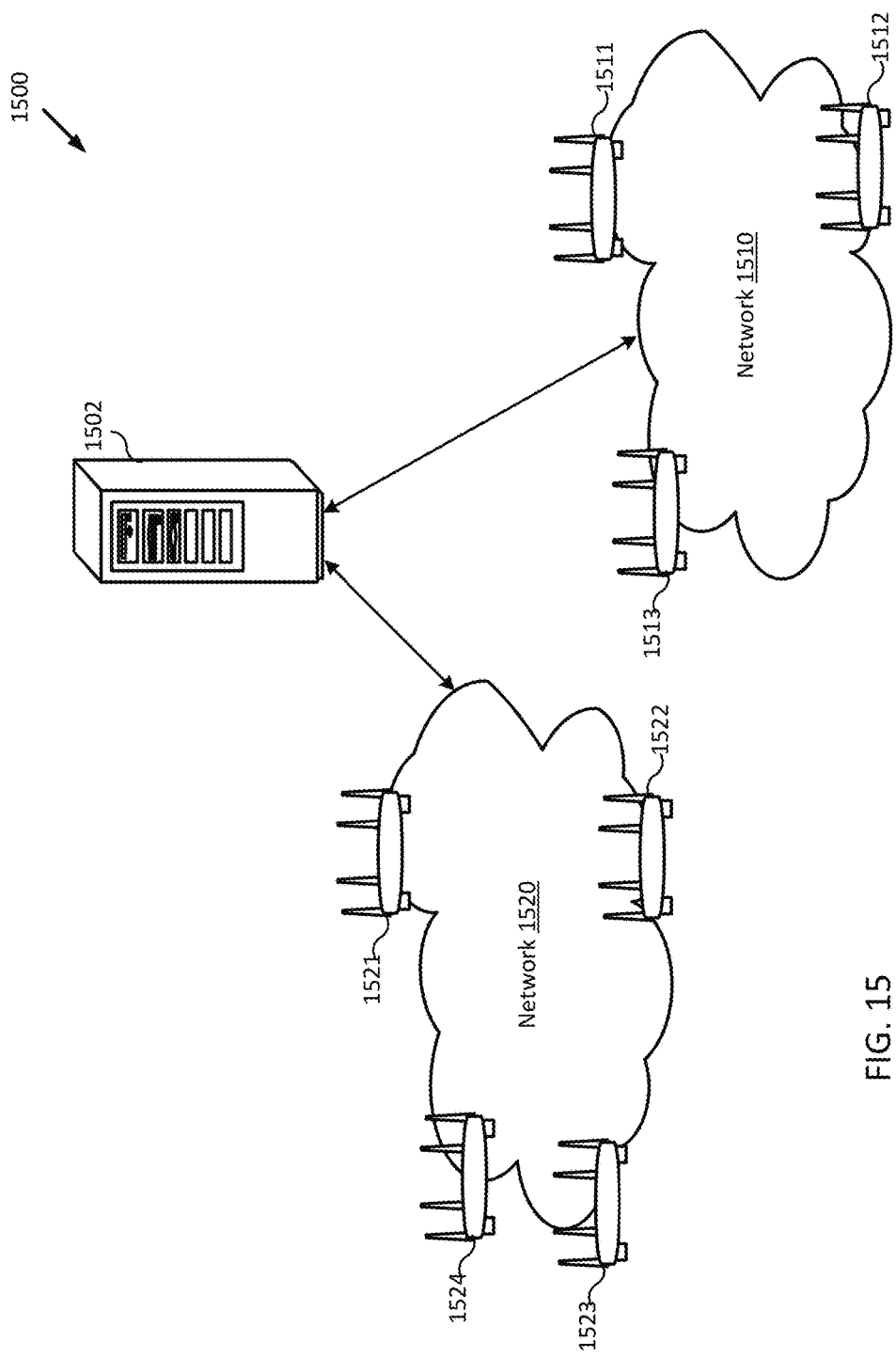
FIG. 15 illustrates an example of a system that includes multiple clusters of routing devices, according to some embodiments.

FIG. 15 illustrates an example of a system 1500 that includes multiple clusters of routing devices, according to some embodiments. For example, system 1550 may include a first cluster of routing devices 1511, 1512, and 1513 that are part of a first network 1510, and a second cluster or routing devices 1521, 1522, 1523, and 1524 that are part of a second network 1520. Each routing device can be a router, a gateway, an access point, a repeater, a network bridge, a network switch, a network hub, a modem, a base station, other networking device that can provide network access to one or more computing devices, or any combination thereof. In some embodiments, network 1510 can be part of network 1520 or vice versa, and/or network 1510 may be communicatively coupled to network 1520. Furthermore, it should be understood that in some embodiments, system 1500 may include additional networks, and each network may have any number of routing devices. System 1500 may also include a network management device 1502 to choreograph the application data caching performed by the routing devices in system 1500. Network management device 1502 can be a computer, a server computer, or other computing device suitable for monitoring network traffic. In some embodiments, the functionality of network management device 1502 can be implemented as part of a routing device in system 1500. In some embodiments, network management device 1502 may be associated with a network service provider or with an application data host.

According to some embodiments, network management device 1502 is communicatively coupled to the routing devices in system 1500, and is used to monitor and track the application data requests and the network resource identifiers associated with the application data requests in system 1500. For example, each time a routing device receives an application data request, the routing device may send information about the application data request to network management device 1502. In some embodiments, system 1500 can be configured such that when the routing devices in system 1500 forwards their application data requests to the appropriate application data host, the forwarded requests transit through network management device 1502 such that network management device 1502 can monitor the application data requests without additional messages from the routing devices.

When network management device 1502 determines that the demand for application data correspond to a network resource identifier is increasing or is expected to increase, network management device 1502 may choreograph the routing devices in system 1500 to cache the application data correspond to that network resource identifier. For example, in some embodiments, network management device 1502 may monitor the application data requests for a particular application data received by the routing devices managed by network management device 1502, and aggregating the application data requests over a caching time window to derive an aggregated number of application data requests received on the routing devices. Network management device 1502 may determine that the demand for application data is growing by determining whether the aggregated number of application data requests corresponding to a network resource identifier received within the caching time window is above a caching threshold.

To choreograph the application data caching in system 1500, network management device 1502 may notify one or more routing devices in system 1500 to cache the application data. For example, this may include notifying one or more routing device that have received a request for the application data, as well as one or more routing devices that may not have received a request for the application data. In some embodiments, network management device 1502 may notify one or more routing devices in system 1500 to cache the application data first, and then push the application data to addition routing devices such that the application data can be disseminated throughout system 1500. In some embodiments, network management device 1502 may selectively instruct only some of the routing devices in system 1500 to cache the application data, and network management device 1502 may select the routing device based on any one or more of capacity and/or the availability of the application data cache of the routing device, the number of client devices connected to the routing device, the geographic location of each routing device, etc.

In some embodiments, network management device 1502 may notify a group of routing devices in system 1500 to cache a different portion of the application data in each routing device of the group. For example, network management device 1502 may notify each routing device in network 1510 or network 1520 to cache a different portion of the application data, such that the entirety of the application data can be made available to client device in the network. In some embodiments, the proportion of the application data being cached at each routing device may depend on the capacity and/or the availability of the application data cache of each routing device, the number of client devices connected to each routing device, the geographic location of each routing device, etc., or any combination thereof.

When network management device 1502 determines that the demand for the cached application data correspond is decreasing or is expected to decrease, network management device 1502 may notifying the routing devices in system 1500 to de-cache the application data. For example, after notifying the routing devices to cache the application data, network management device 1502 may monitor subsequent application data requests received for the cached application data. Network management device 1502 may aggregate the subsequent application data requests over a de-caching time window to derive an aggregated number of subsequent application data requests received on the routing devices. Network management device 1502 may determine that the demand for the application data is decreasing when the aggregated number of subsequent application data requests within the de-caching time window is below a de-caching threshold, and in response, may notifying the routing devices in system 1500 to de-cache the application data. In some embodiments, the duration or the time period of the de-caching time window can be the same or different as the caching time window. In some embodiments, the de-caching threshold number of requests can be the same or different as the caching threshold number of requests.

Figure 16:
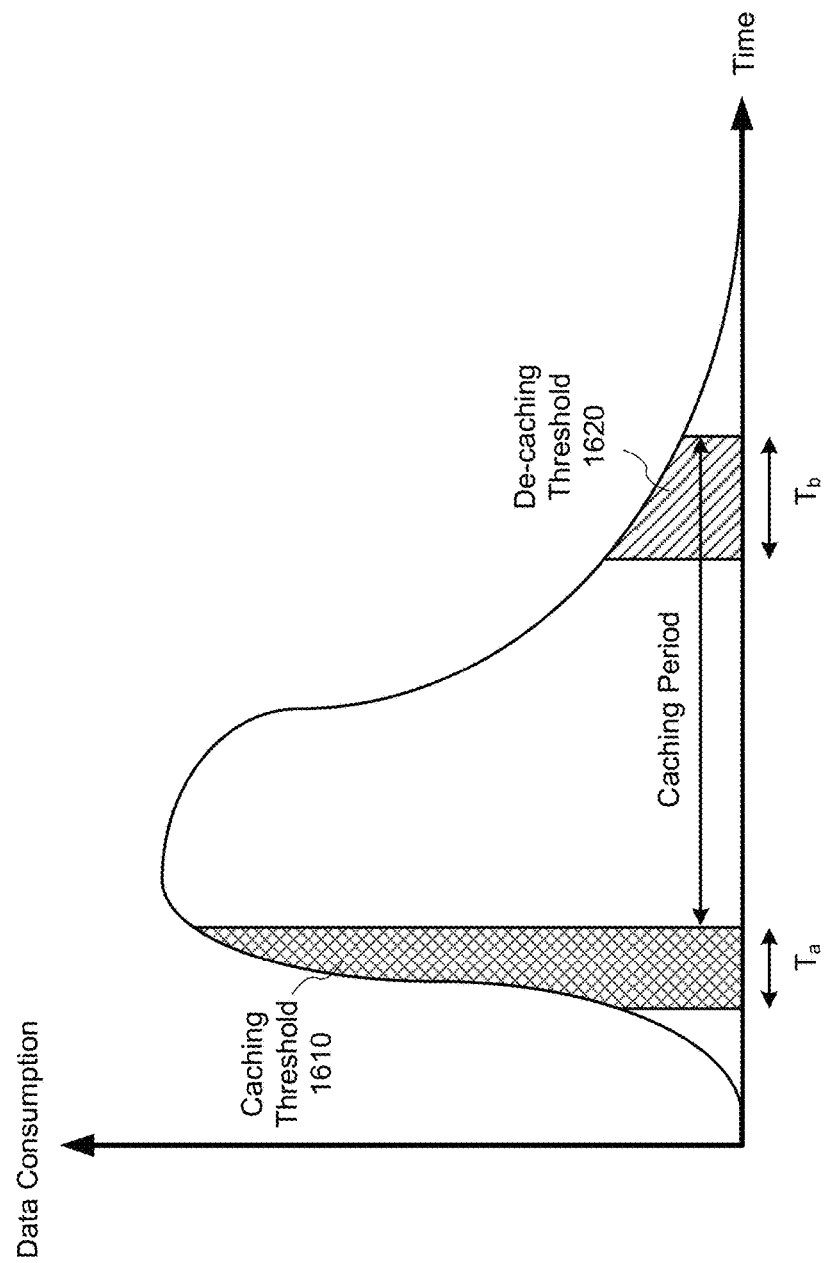
FIG. 16 illustrates an example of a graph showing data consumption over time, according to some embodiments.

FIG. 16 illustrates an example of a graph of data consumption over time, according to some embodiments. In FIG. 16, the horizontal axis is time, and the vertical axis is the data consumption of application data corresponding to a particular network resource identifier. Data consumption can be measured, for example, by the number of application data requests corresponding to the network resource identifier, and indicates the demand for the application data. As shown, when access to the application data first becomes available (e.g., when the application data is first made available online), the demand for the application data increases dramatically. Over time, the demand for the application data may decrease and taper off. This type of demand pattern for application data may correspond, for example, to an episode of a television program. When a new episode is released online, the demand to view the new episode may increase dramatically during the first few days of the release. Then as the week goes by, and as the next episode becomes available, the demand for this episode may taper off. It should be understood that this type of demand pattern can also be seen in other types of application data.

In order to make the application data available from the application data cache of a routing device during high demand, as discussed above, the number of application data requests for the application data can be monitored over a caching time window $T_a$. When the number of application data requests over the caching time window is above a caching threshold number of requests 1610, a routing device may cache the application data in anticipation of future requests for the application data. During the caching period in which the application data is cached at the routing device, requests for the application data can be fulfilled by the routing device without having to forward the request to the application data host. When the requests for the application data over a de-caching time window $T_b$ drops below a de-caching threshold number of requests 1620, the application data can be de-cached from the routing device because the demand for the application data is expected to decrease. As shown, the caching time window $T_a$ may have a different duration than the de-caching time window $T_b$, and the caching threshold number of requests 1610 can also be different than the de-caching threshold number of requests 1620. In some embodiments, the time windows and the thresholds used may dependent on one or more of the identity of the host of the application data, the type of application data, the size of the application data, the number of client devices connected to the routing device, etc.

Referring back to FIG. 15, in some embodiments, network management device 1502 may learn, over time, application data request patterns of particular networks and/or routing devices. For example, a particular routing device may receive a lot of requests with a particular network resource identifier at 9 pm every Monday. This may correspond, for example, to the time when a weekly program is posted online. As another example, a particular routing device may receive a lot of requests with a particular network resource identifier on the first Tuesday of October every year. This may correspond, for example, to the time when a particular lesson plan of the school year is accessed by the students of a class. In some embodiments, network manage device 1502 may use such past application data request patterns to forecast the demand for the application data. Based on the demand forecast, network manage device 1502 may preemptively instruct one or more routing devices in system 1500 to request and cache certain application data from an application data host shortly before the demand for the application data is expected.

FIGS. 17-21 illustrate exemplary flow diagrams of various processes, according to some embodiments.

Figure 17:
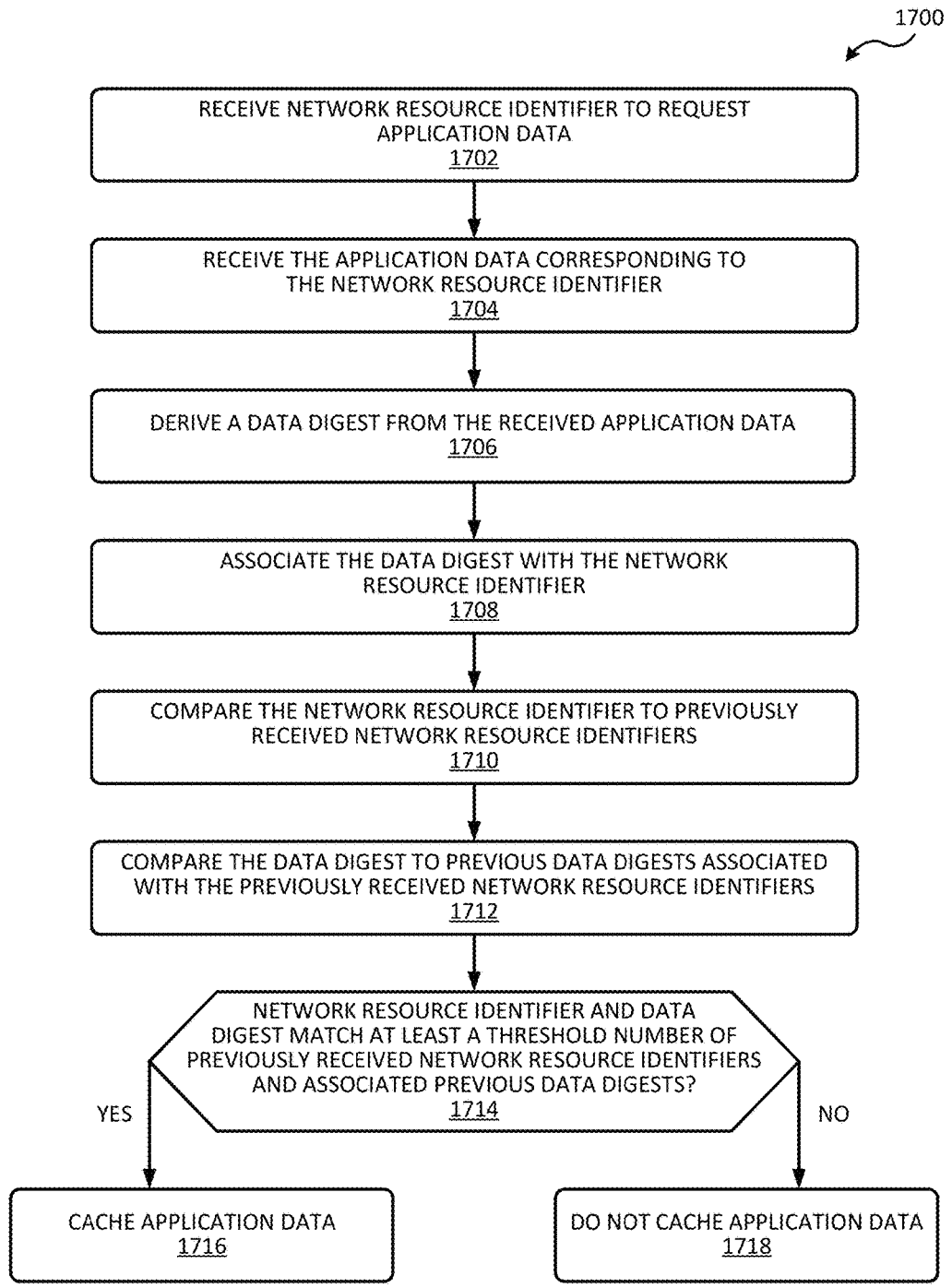
FIG. 17 illustrates a flow diagram of a contextual application data caching process, according to some embodiments.

FIG. 17 illustrates a flow diagram 1700 of a contextual application data caching process, which can be performed, for example, by a routing device, according to some embodiments. At block 1702, a network resource identifier to request application data may be received, for example, by a routing device from a client device. At block 1704, the application data corresponding to the network resource identifier may be received, for example, by the routing device from an application data host hosting the requested application data. The application data may be received in response to the routing device requesting the application data from the application data host (e.g., by forwarding a request from the client device). At block 1706, a data digest is derived from the received application data. In some embodiments, the application data may be encrypted when the application data is received, and the encrypted apparition data may be decrypted before deranging the data digest. At block 1708, the data digest is associated with the network resource identifier (e.g., to form a network resource identifier—data digest pair). At block 1710, the network resource identifier is compared to previously received network resource identifiers. At block 1712, the data digest is compared to previous data digests associated with the previously received network resource identifiers.

Next, a determination is made as to whether to cache the application data (e.g., in an application data cache of the routing device) based on at least the comparison of the network resource identifier to previously received network resource identifiers, and the comparison of the data digest to previous data digests associated with the previously received network resource identifiers are used to determine whether to cache the application data. For example, a determination can be made at block 1714 whether the network resource identifier and data digest matches at least a threshold number of previously received network resource identifiers and associated previous data digests. If the network resource identifier and data digest match at least the threshold number of previously received network resource identifier and associated previous data digest pairs, the application data can be determined to be cached at block 1716. In some embodiments, the application data is determined to be cached when at least the threshold number of previously received network resource identifiers are received within a predetermined time period. In some embodiments, the application data can be re-encrypted before being cached, or the application data can be cached unencrypted.

If the network resource identifier and data digest does not match at least the threshold number of previously received network resource identifier and associated previous data digest pairs, the application data can be determined not to be cached at block 1718. In some embodiments, the application data can be determined not to be cached when the data digest does not match one or more of the previous data digests associated with the previously received network resource identifiers matching the network resource identifier.

In some embodiments, when the application data is determined to be cached, a time-to-live for the cached application data can be determined, for example, based on the number of previously received network resource identifiers matching the network resource identifier. In some embodiments, when a subsequent network resource identifier matching the network resource identifier is received; the time-to-live of the cached application data can be updated. The cached application data can be de-cached (e.g., from the application data cache of the routing device) after the time-to-live of the cached application data has expired.

Figure 18:
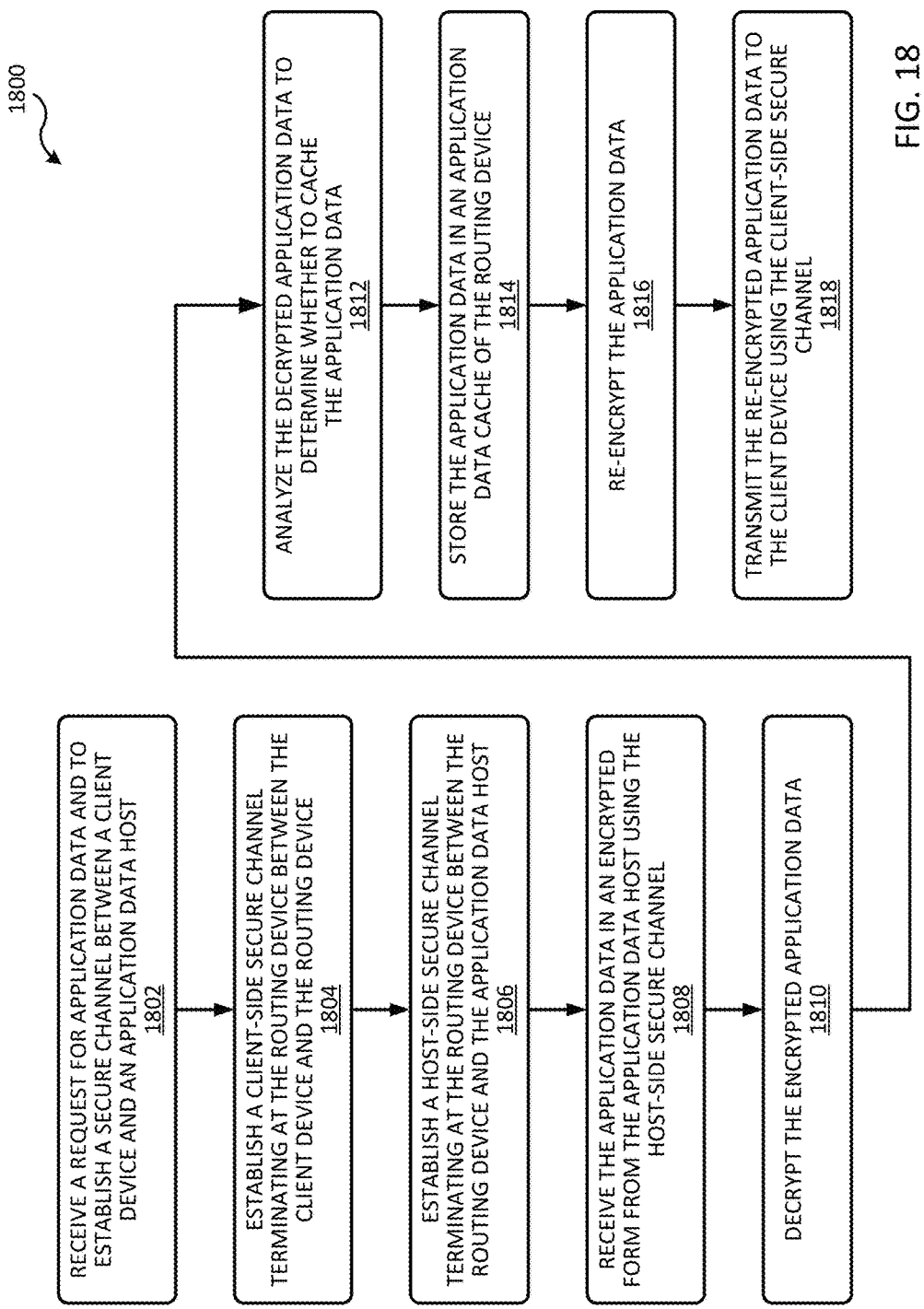
FIG. 18 illustrates a flow diagram of a routing device data caching process, according to some embodiments.

FIG. 18 illustrates a flow diagram 1800 of a routing device data caching process, according to some embodiments. At block 1802, a request for application data and to establish a secure channel between a client device and an application data host may be received, for example, by a routing device from a client device. The request may correspond, for example, to a HTTPS request. At block 1804, instead of establishing the secure channel between the client device and the application data host, a client-side secure channel between the client device and the routing device, which terminates at the routing device can be established. In some embodiments, prior to establishing the client-side secure channel, a redirect response can be sent to the client device to indicate that request received at block 1802 is being redirected, and in some embodiments, the client-side secure channel can be established after receiving, in response to the redirect, a confirmation to establish the client-side secure channel. At block 1806, a host-side secure channel between the routing device and the application data host, which terminates at the routing device can be established.

At block 1808, the requested application data in an encrypted form may be received from the application data host using the host-side secure channel. At block 1810, the encrypted application data can be decrypted. At block 1812, the decrypted application data can be analyzed to determine whether to cache the application data. At block 1814, the application data can be stored or cached in an application data cache of the routing device. In some embodiments, the application data is stored as Open System Interconnection (OSI) application layer data without transport service headers in the application data cache of the routing device. In some embodiments, the application data being stored in the application data cache of the routing device is re-encrypted (e.g., using a routing device encryption key that is separate and different from the secure channel session keys).

At block 1816, the application data can be re-encrypted for transmission, for example, to the client device that sent the request for the application data at block 1802. At block 1818, the re-encrypted application data can transmitted to the client device using the client-side secure channel. The application data may remain being stored in the application data cache of the routing device after the re-encrypted application data has been transmitted to the client device, such that future transmission of the application data can be carried out by retrieving the application data from the application data cache. For example, in some embodiments, a request for the application data may be received from another client device, and the application data stored in the application data cache can be transmitted to that other client device without requesting the application data from the application data host. In some embodiments, when it is determined that the application data is no longer be cached, the application data can be de-cached from the application data cache of the routing device.

In some embodiments, not all requested application data are cached. For example, a request for other application data can be received, and a determination that the other application data is not to be cached can be made. In such a scenario, the other application data being requested can be transmitted to a client device without storing the other application data in the application data cache of the routing device.

In some embodiments, application data that is being requested for the first time may not be cached, and it may take one or more previous requests for the same application data before the application data is determined to be cached at block 1812. For example, in some embodiments, a previous request for the same application data may be received, and the application data for the previous request may be transmitted to a client device without storing the application data in the application data cache of the routing device.

Figure 19:
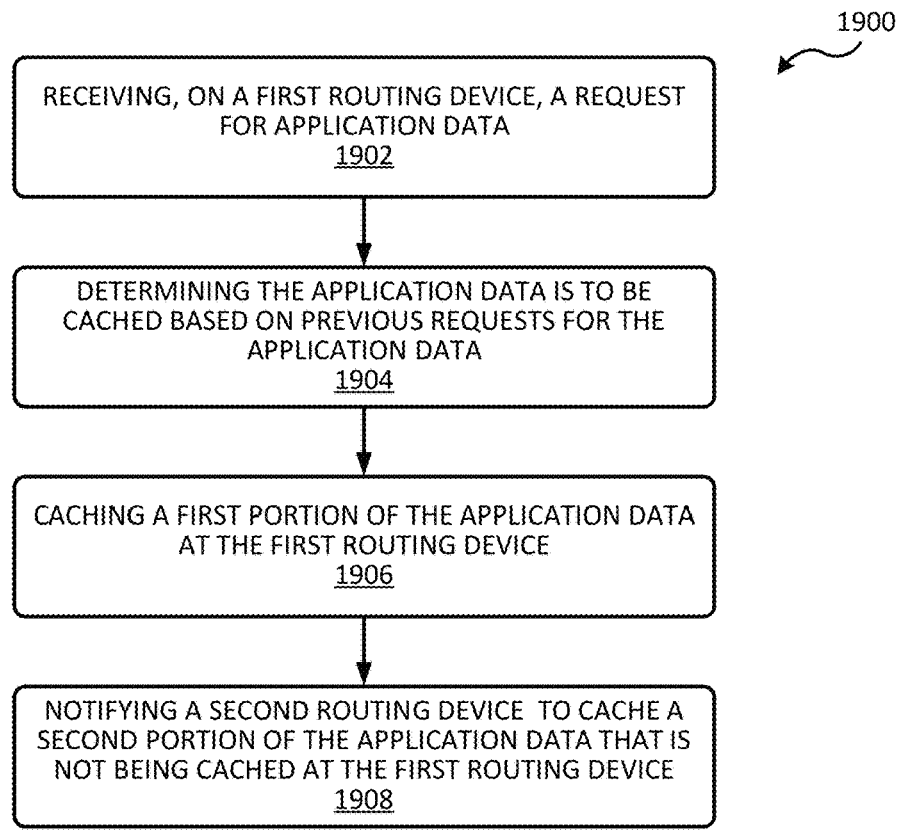
FIG. 19 illustrates a flow diagram of a distributed caching process, according to some embodiments.

FIG. 19 illustrates a flow diagram 1900 of a distributed caching process, which can be implemented, for example, with a system of routing devices in local area network (e.g., an intranet), according to some embodiments. At block 1902, a requested for application data may be received on a first routing device. At block 1904, the requested application data can be determined to be cached bashed on previous requests for the same application data, for example, by using the techniques described herein. At block 1906, a first portion of the appellation data can be cached at the first routing device. At block 1908, a second routing device may be notified to cache a second portion of the application data that is not being cached at the first routing device.

In some embodiments, the second portion of the application data may be cached at the second routing device after the application data cache of the first routing device is full. In some embodiments, the second portion of the application data being cached at the second routing device can be provided by the first routing device to the second routing device. In some embodiments, prior to being notified to cache the second portion of the application data, the second routing device may not have received a prior request for the application data.

In some embodiments, the second routing device may have received a prior request for the application data, and the application data may be determined to be cached at a time when the second routing device is still in a process of transmitting the application data to a client device for that prior request. In such a scenario, the second portion of the application data being cached at the second routing device may correspond to a portion of the application data that has not yet been transmitted by the second routing device to the client device at the time caching of the application data is determined. In some embodiments, the first portion of the application being cached at the first routing device may correspond to a transmitted portion of the application data that has already been transmitted by the second routing device to the client device at the time when caching of the application data is determined.

Figure 20:
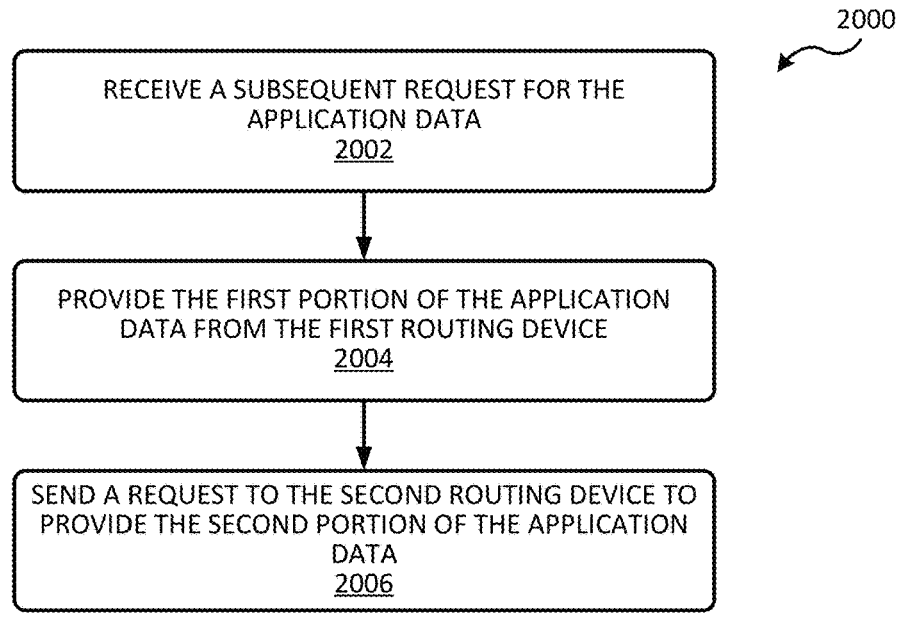
FIG. 20 illustrates a flow diagram of another distributed caching process, according to some embodiments.

FIG. 20 illustrates a flow diagram 2000 of another distributed caching process, which can be implemented, for example, with a system of routing devices in local area network (e.g., an intranet), according to some embodiments.

At block 2002, a subsequent request for cached application data for a client device may be received. At block 2004, the first portion of the application data can be provided from the first routing device to the client device for the subsequent request. At block 2006, a request for the second portion of the application data can be sent to the second routing device. The request at 2006 can be a request to the second routing device to provide the second portion of the application data directly to the client device, or a request to the second routing device to provide the second portion of the application data to the first routing device for transmission to the client device. In some embodiments, when the application data is determined to no longer be cached, the second routing device can be notified to de-cache the second portion of the application data.

Figure 21:
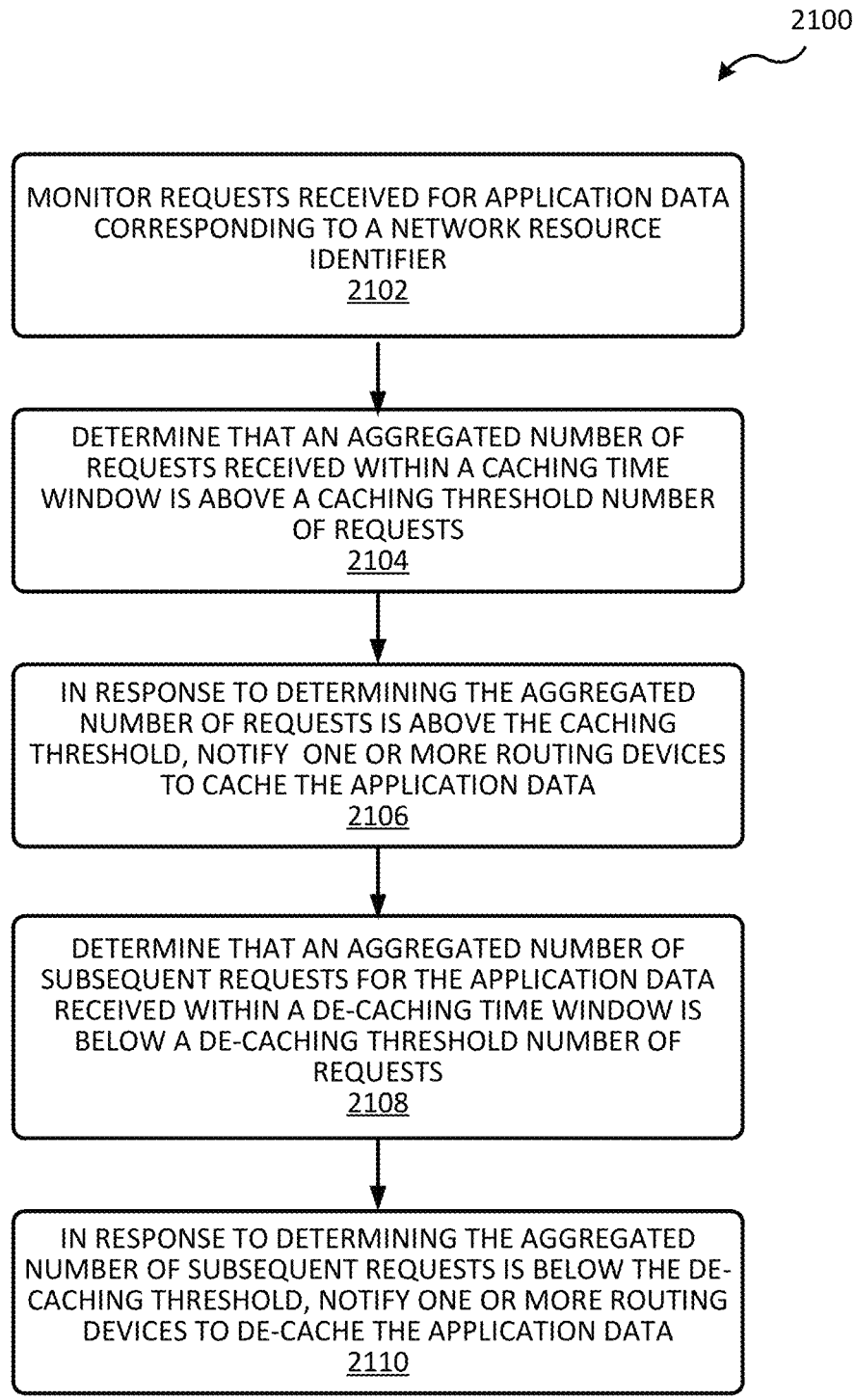
FIG. 21 illustrates a flow diagram of a choreographed caching process, according to some embodiments.

FIG. 21 illustrates a flow diagram 2100 of a choreographed caching process, which can be implemented, for example, with a system of routing devices, according to some embodiments. At block 2102, requests for application data corresponding to a network resource identifier received, for example, on a system of routing devices, can be monitored. The number of requests received across the system of routing devices within a caching time window can be aggregated to derive an aggregated number of requests for the particular application data. At block 2104, a determination can be made as to whether the aggregated number of requests received within a caching time window is above a caching threshold. At block 2106, in response to determining the aggregated number of requests is above the caching threshold, one or more routing devices can be notified to cache the application data.

After one or more of the routing devices have been notified to cache the application data, subsequent requests received across the system of routing devices for the application data can be monitored, and the subsequent requests received within a de-caching time window can be aggregated to derive an aggregated number of subsequent. At block 2108, a determination can be made as to whether the aggregated number of subsequent requests for the application data received within a de-caching time window is below a de-caching threshold. At block 2110, in response to determining the aggregated number of subsequent requests is below the de-caching threshold, one or more routing devices can be notified to de-cache the application data.

In some embodiments, the caching time window can be the same or be different than the de-caching time window. In some embodiments, caching threshold can be the same or be different than the de-caching threshold. In some embodiments, one or more addition routing devices that have not yet received a request for the application data can be notified to preemptively cache the application data. In some embodiments, one or more routing devices can be instructed to push the application data to one or more additional routing devices. In some embodiments, the one or more of the plurality of routing devices to cache the application data includes notifying each of the one or more routing devices being notified to cache the application data can be instructed to cache a different portion of the application data.

Figure 22:
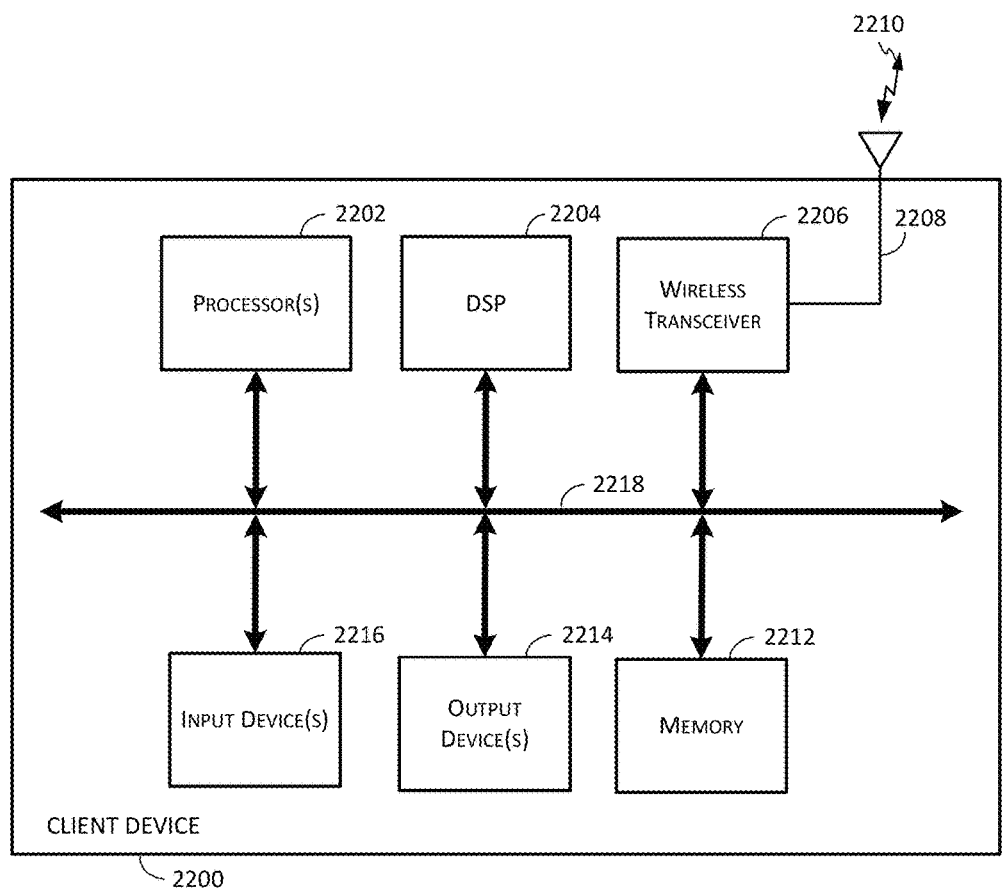
FIG. 22 illustrates a block diagram of an example of a client device, according to some embodiments.

FIG. 22 illustrates an example of a client device 2200, according to some embodiments. Client device 2200 may include any human-to-machine interface with network connection capability that allows access to a network. For example, client device 2200 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect sensor, Wiimote, or the like), an internet of things (IoT) device interface (e.g., an Internet enabled appliance such as a wall switch, a control interface, or the like). Client device 2200 includes hardware elements that can be electrically coupled via a bus 2218 (or may otherwise be in communication, as appropriate). In one embodiment, the bus 2218 can be used for the processor(s) 2202 to communicate between cores and/or with the memory 2212. The hardware elements may include one or more processors 2202, including without limitation one or more general-purpose processors and/or one or more special-purpose processors (such as digital signal processing chips, graphics acceleration processors, and/or the like); one or more input devices 2216, which can include without limitation a camera, a mouse, a keyboard, a touch sensitive screen, a touch pad, a keypad, and/or the like; and one or more output devices 2214, which can include, without limitation, a display, a printer, and/or the like.

Client device 2200 may include one or more wireless transceivers 2206 connected to the bus 2218. The wireless transceiver 2206 may be operable to receive wireless signals via antenna 2208 (e.g., signal 2210). The wireless signal 2210 may be transmitted via a wireless network. In some embodiments, the wireless network may be any wireless network such as a wireless local area network (e.g., local area network 100), such as WiFi, a Personal Access Network (PAN), such as Bluetooth or Zigbee, or a cellular network (e.g. a GSM, WCDMA, LTE, CDMA2000 network). Wireless transceiver 2206 may be configured to receive various radio frequency (RF) signals (e.g., signal 2210) via antenna 2208 from one or more gateways, network devices, other access devices, cloud networks, and/or the like. Client device 2200 may also be configured to decode and/or decrypt, via the DSP 2204 and/or processor(s) 2202, various signals received from one or more gateways, network devices, other access devices, cloud networks, and/or the like.

Client device 2200 may further include (and/or be in communication with) one or more non-transitory machine-readable storage mediums or storage devices (e.g., memory 2212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2212, such as RAM, ROM, FLASH, or disc drive, and executed by processor(s) 2202 or DSP 2204. Client device 2200 can also comprise software elements (e.g., located within the memory 2212), including, for example, an operating system, device drivers, executable libraries, and/or other code, such as one or more application programs, which may comprise computer programs implementing the functions provided by various embodiments, and/or may be designed to implement methods and/or configure systems, as described herein.

By way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described. Memory 2212 may be a non-transitory machine-readable storage medium, processor-readable memory, and/or a computer-readable memory that stores the one or more computer-program products configured to cause the processor(s) 2202 to perform the functions described. In other embodiments, one or more of the functions described may be performed in hardware.

A set of these instructions and/or code might be stored on a non-transitory machine-readable storage medium, such as memory 2212. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by client device 2200 and/or might take the form of source and/or installable code, which, upon compilation and/or installation on client device 2200 (e.g., using any of a variety of generally available compilers, installation programs, compression/decompression utilities, etc.) then takes the form of executable code.

Figure 23:
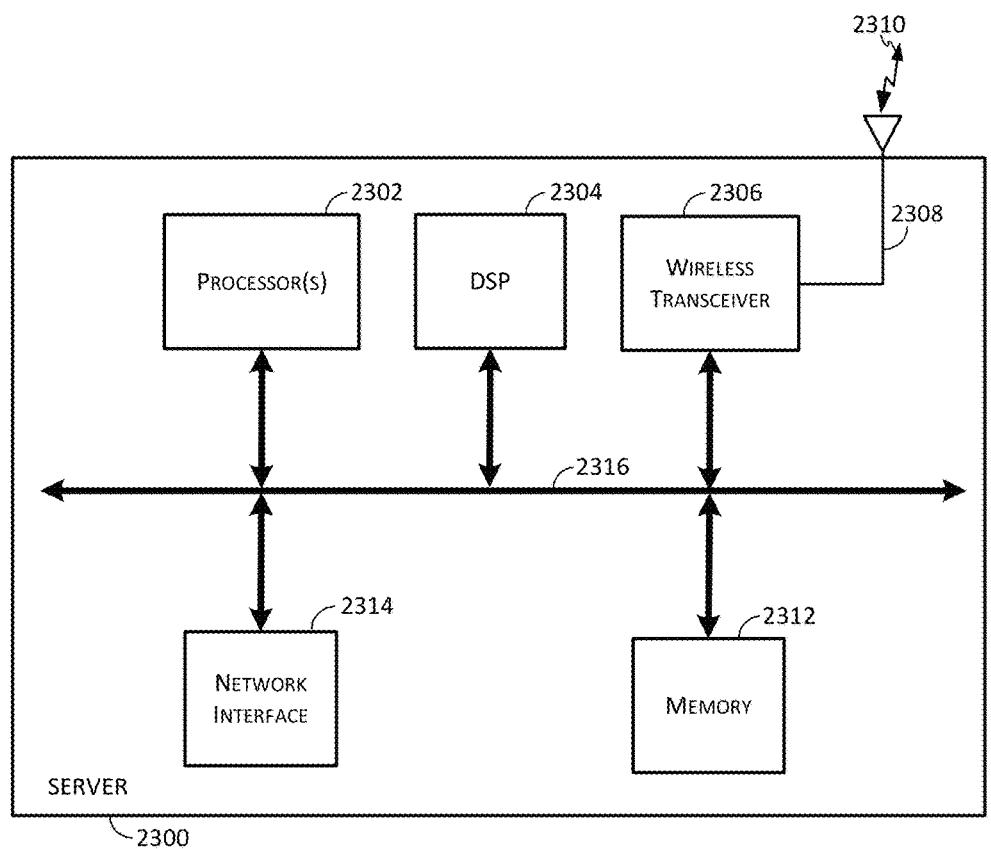
FIG. 23 illustrates a block diagram of an example of a server, according to some embodiments.

FIG. 23 illustrates an example of a server 2300, according to some embodiments. Server 2300 includes hardware elements that can be electrically coupled via a bus 2316 (or may otherwise be in communication, as appropriate). In one embodiment, the bus 2316 can be used for the processor(s) 2302 to communicate between cores and/or with the memory 2312. The hardware elements may include one or more processors 2302, including without limitation one or more general-purpose processors and/or one or more special-purpose processors (such as digital signal processing chips, graphics acceleration processors, and/or the like), memory 2312, DSP 2304, a wireless transceiver 2306, a bus 2316, and antenna 2308. Furthermore, in addition to the wireless transceiver 2306, server 2300 can further include a network interface 2314 to communicate with a network (e.g., a local area network, a network of a preferred carrier, Internet, etc.).

Server 2300 may further include (and/or be in communication with) one or more non-transitory machine-readable storage mediums or storage devices (e.g., memory 2312), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2312. Server 2300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems. Memory 2312 may be a non-transitory machine-readable storage medium, processor-readable memory, and/or a computer-readable memory that stores the one or more computer-program products configured to cause the processor(s) 2302 to perform the various functions. In other embodiments, one or more functions may be performed in hardware.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method comprising:
    receiving, on a routing device, a network resource identifier to request application data;
    receiving the application data corresponding to the network resource identifier;
    deriving a data digest from the received application data, wherein the data digest represents a portion of the received application data;

associating the data digest with the network resource identifier;

comparing the network resource identifier to previously received network resource identifiers;

comparing the data digest to previous data digests associated with the previously received network resource identifiers;

determining a total number of combination matches, wherein a combination match includes a previously received network resource identifier that matches the network resource identifier and a previous data digest associated with the previously received network resource identifier that matches the data digest;

comparing the total number of combination matches with a threshold number of combination matches, wherein the threshold number of combination matches is determined using a type of data associated with the application data; and determining whether to cache the application data in an application data cache of the routing device based on at least the comparison of the total number of combination matches with a threshold number of combination matches.

2. The method of claim 1, wherein the application data is determined to be cached when the network resource identifier and the data digest match at least a threshold number of previously received network resource identifiers and associated previous data digests.

3. The method of claim 2, wherein the application data is determined to be cached when the threshold number of previously received network resource identifiers are received within a predetermined time period.

4. The method of claim 1, wherein the application data is determined not to be cached when the data digest does not match one or more of the previous data digests associated with the previously received network resource identifiers matching the network resource identifier.

5. The method of claim 1, wherein when the application data is determined to be cached, the method further comprises:
   determining a time-to-live for the application data based on a number of previously received network resource identifiers matching the network resource identifier.

6. The method of claim 5, further comprising:
   receiving a subsequent network resource identifier matching the network resource identifier; and
   updating the time-to-live of the application data.

7. The method of claim 5, further comprising:
   de-caching the application data from the application data cache of the routing device after the time-to-live of the application data has expired.

8. The method of claim 1, wherein the application data is encrypted when the application data is received, and the method further comprises decrypting the received application data before deriving the data digest.

9. The method of claim 8, wherein the application data is re-encrypted before being cached.

10. The method of claim 8, wherein the application data is cached unencrypted.

11. A routing device, comprising:
    an application data cache;
    one or more data processors; and
    a non-transitory computer readable storage medium containing instructions, which when executed on the one or more data processors, cause the one or more data processors to perform operations including:
       receiving a network resource identifier to request application data;
       receiving the application data corresponding to the network resource identifier;
       deriving a data digest from the received application data, wherein the data digest represents a portion of the received application data;
       associating the data digest with the network resource identifier;
       comparing the network resource identifier to previously received network resource identifiers;
       comparing the data digest to previous data digests associated with the previously received network resource identifiers;
       determining a total number of combination matches, wherein a combination match includes a previously received network resource identifier that matches the network resource identifier and a previous data digest associated with the previously received network resource identifier that matches the data digest;
       comparing the total number of combination matches with a threshold number of combination matches, wherein the threshold number of combination matches is determined using a type of data associated with the application data; and
       determining whether to cache the application data in an application data cache of the routing device based on at least the comparison of the total number of combination matches with a threshold number of combination matches.

12. The routing device of claim 11, wherein the application data is determined to be cached when the network resource identifier and the data digest matches a threshold number of previously received network resource identifiers and associated previous data digests.

13. The routing device of claim 12, wherein the application data is determined to be cached when the threshold number of previously received network resource identifiers is received within a predetermined time period.

14. The routing device of claim 11, wherein the application data is determined not to be cached when the data digest does not match one or more of the previous data digests associated with the previously received network resource identifiers matching the network resource identifier.

15. The routing device of claim 11, wherein when the application data is determined to be cached, the operations further include:
    determining a time-to-live for the application data based on a number of previously received network resource identifiers matching the network resource identifier.

16. The routing device of claim 15, wherein the operations further includes:
    receiving a subsequent network resource identifier matching the network resource identifier; and
    updating the time-to-live of the application data.

17. The routing device of claim 15, wherein the operations further include:
    de-caching the application data from the application data cache of the routing device after the time-to-live of the application data has expired.

18. The routing device of claim 11, wherein the application data is encrypted when the application data is received, and the operations further include decrypting the received application data before deriving the data digest.

19. The routing device of claim 18, wherein the application data is re-encrypted before being cached.

20. The routing device of claim 18, wherein the application data is cached unencrypted.

21. A non-transitory computer-readable storage medium having instructions stored thereon, which when executed by a computing device, cause the computing device to perform operations including:
    receiving a network resource identifier to request application data;
    receiving the application data corresponding to the network resource identifier;
    deriving a data digest from the received application data, wherein the data digest represents a portion of the received application data;
    associating the data digest with the network resource identifier;
    comparing the network resource identifier to previously received network resource identifiers;
    comparing the data digest to previous data digests associated with the previously received network resource identifiers;
    determining a total number of combination matches, wherein a combination match includes a previously received network resource identifier that matches the network resource identifier and a previous data digest associated with the previously received network resource identifier that matches the data digest;
    comparing the total number of combination matches with a threshold number of combination matches, wherein the threshold number of combinations is determined using a type of data associated with the application data; and
    determining whether to cache the application data in an application data cache of a routing device based on at least the comparison of the total number of combination matches with a threshold number of combination matches.

22. The non-transitory computer-readable storage medium of claim 21, wherein the application data is determined to be cached when the network resource identifier and the data digest matches a threshold number of previously received network resource identifiers and associated previous data digests.

23. The non-transitory computer-readable storage medium of claim 22, wherein the application data is determined to be cached when the threshold number of previously received network resource identifiers is received within a predetermined time period.

24. The non-transitory computer-readable storage medium of claim 21, wherein the application data is determined not to be cached when the data digest does not match one or more of the previous data digests associated with the previously received network resource identifiers matching the network resource identifier.

25. The non-transitory computer-readable storage medium of claim 21, wherein when the application data is determined to be cached, the operations further include:
    determining a time-to-live for the application data based on a number of previously received network resource identifiers matching the network resource identifier.

26. The non-transitory computer-readable storage medium of claim 25, wherein the operations further includes:
    receiving a subsequent network resource identifier matching the network resource identifier; and
    updating the time-to-live of the application data.

27. The non-transitory computer-readable storage medium of claim 25, wherein the operations further include:
    de-caching the application data from the application data cache of the routing device after the time-to-live of the application data has expired.

28. The non-transitory computer-readable storage medium of claim 21, wherein the application data is encrypted when the application data is received, and the operations further include decrypting the received application data before deriving the data digest.

29. The non-transitory computer-readable storage medium of claim 28, wherein the application data is re-encrypted before being cached.

30. The non-transitory computer-readable storage medium of claim 28, wherein the application data is cached unencrypted.

* * * * *